Feb. 7, 1956   R. BIHLER ET AL   2,733,752
MACHINE FOR MANUFACTURING POWDER PUFFS
Filed Aug. 8, 1950   9 Sheets-Sheet 2

INVENTORS.
ROGER BIHLER
SIDNEY R. BELL
BY James and Franklin
ATTORNEYS

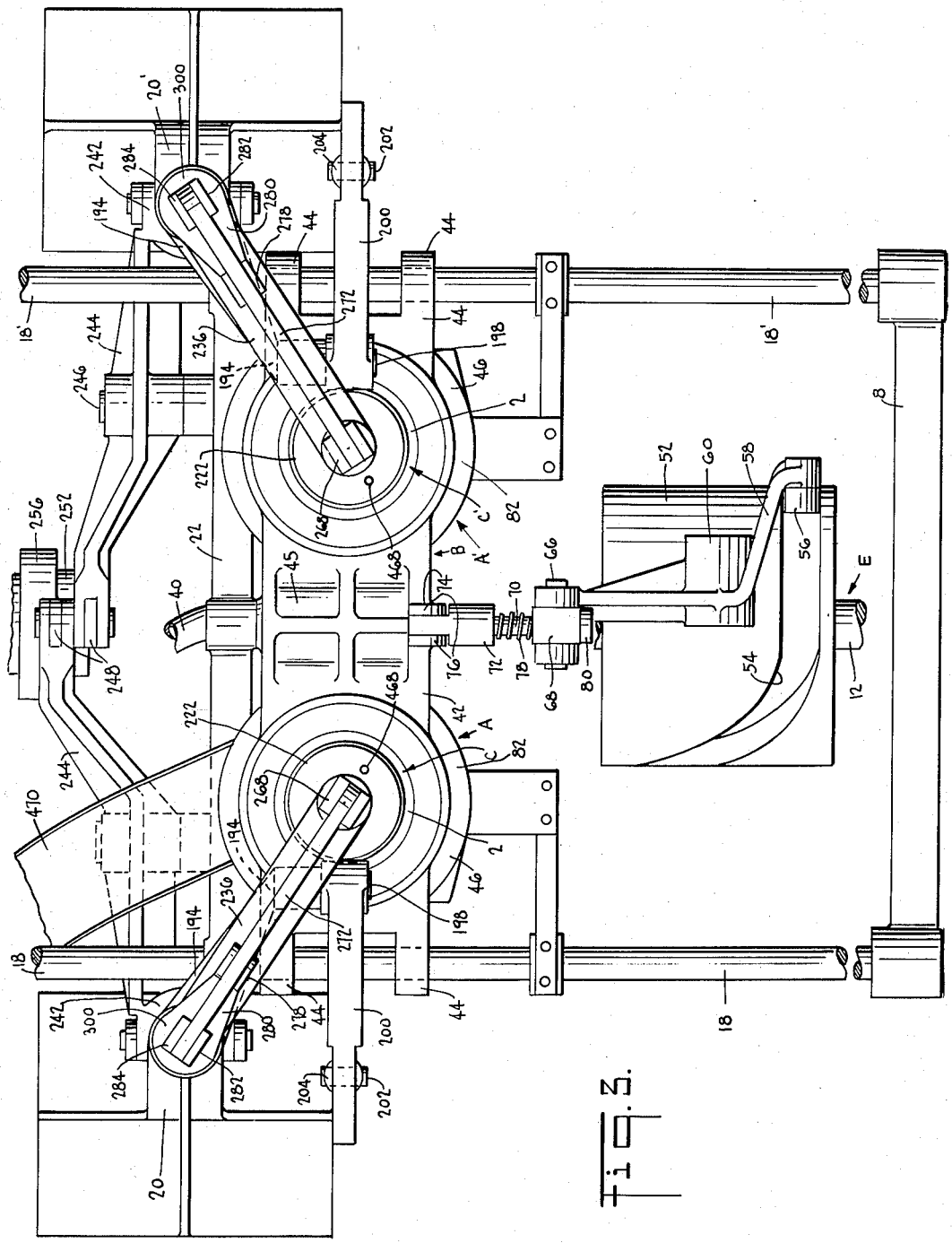

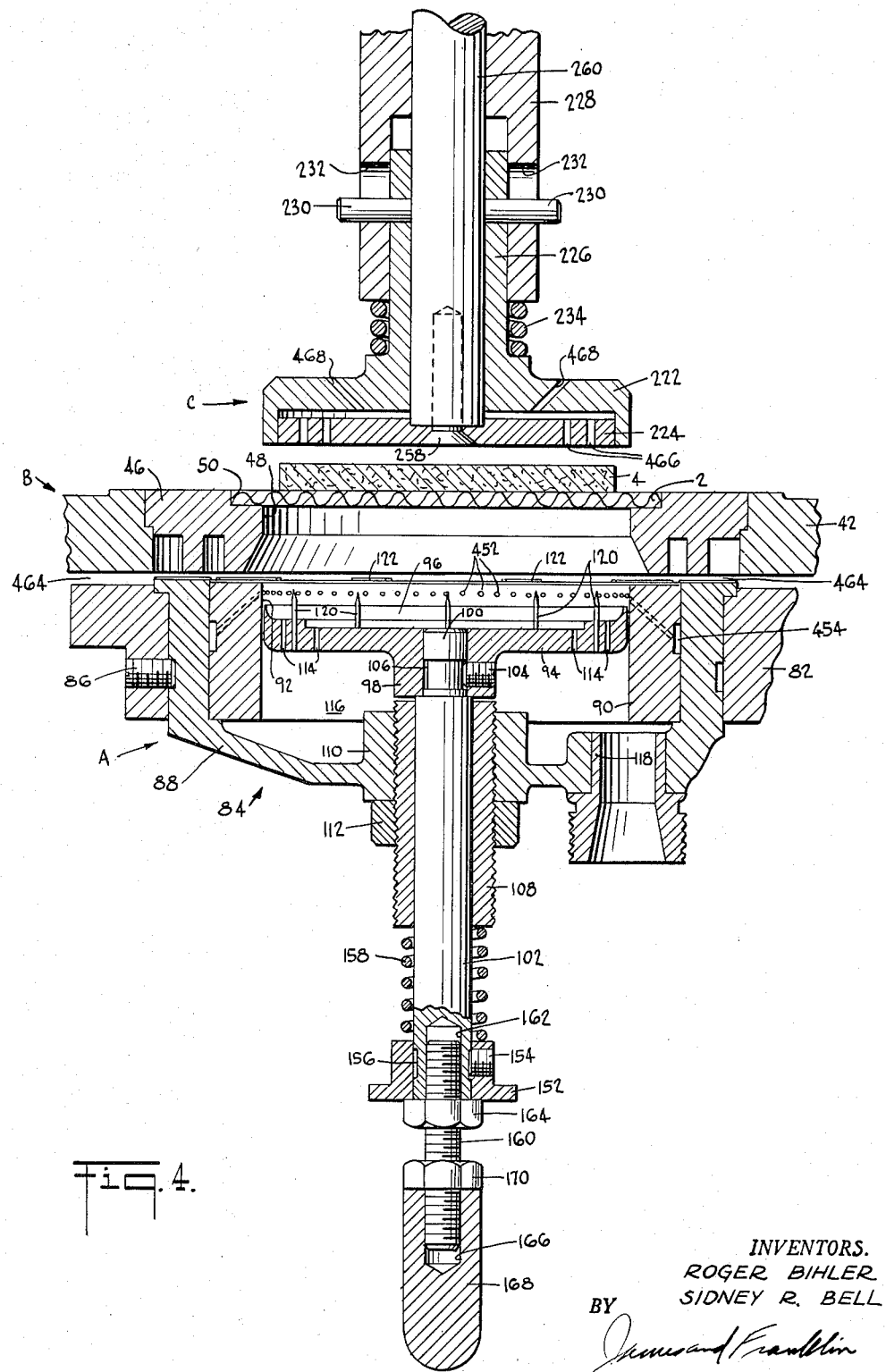

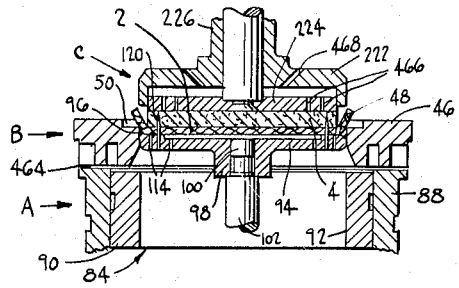
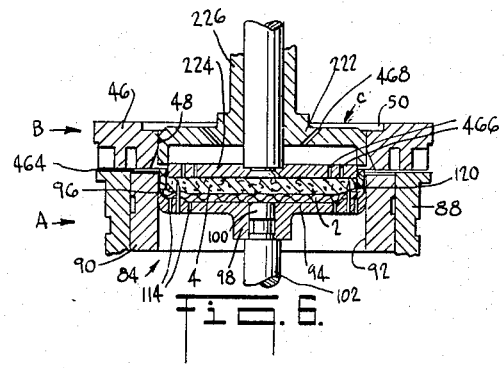
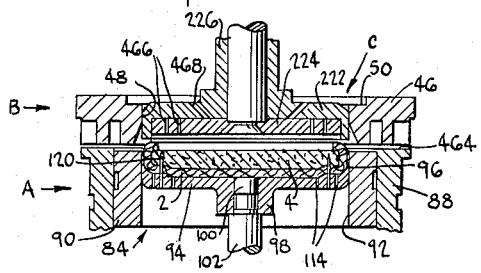
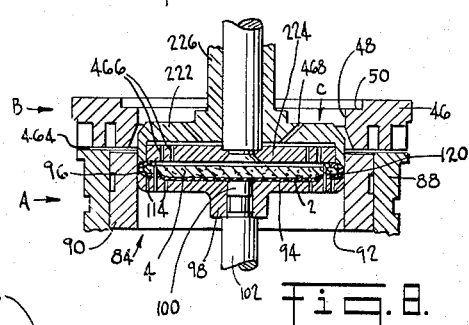
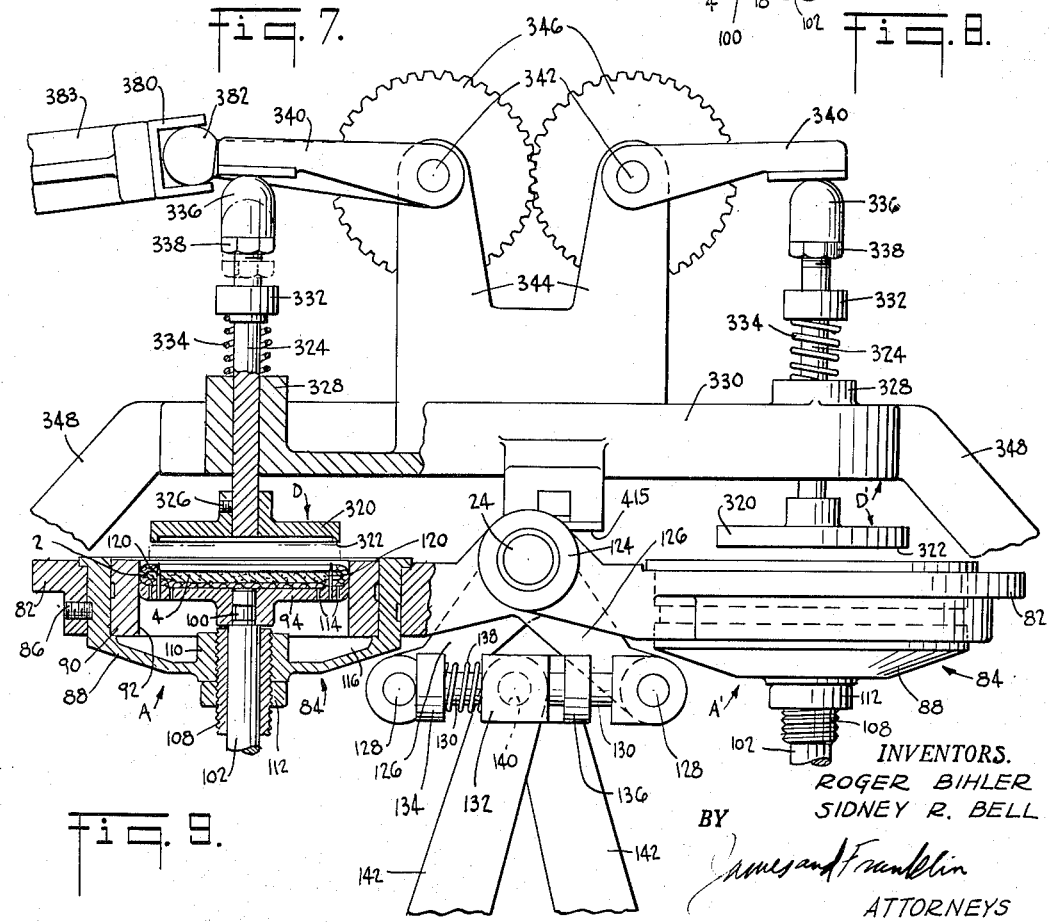

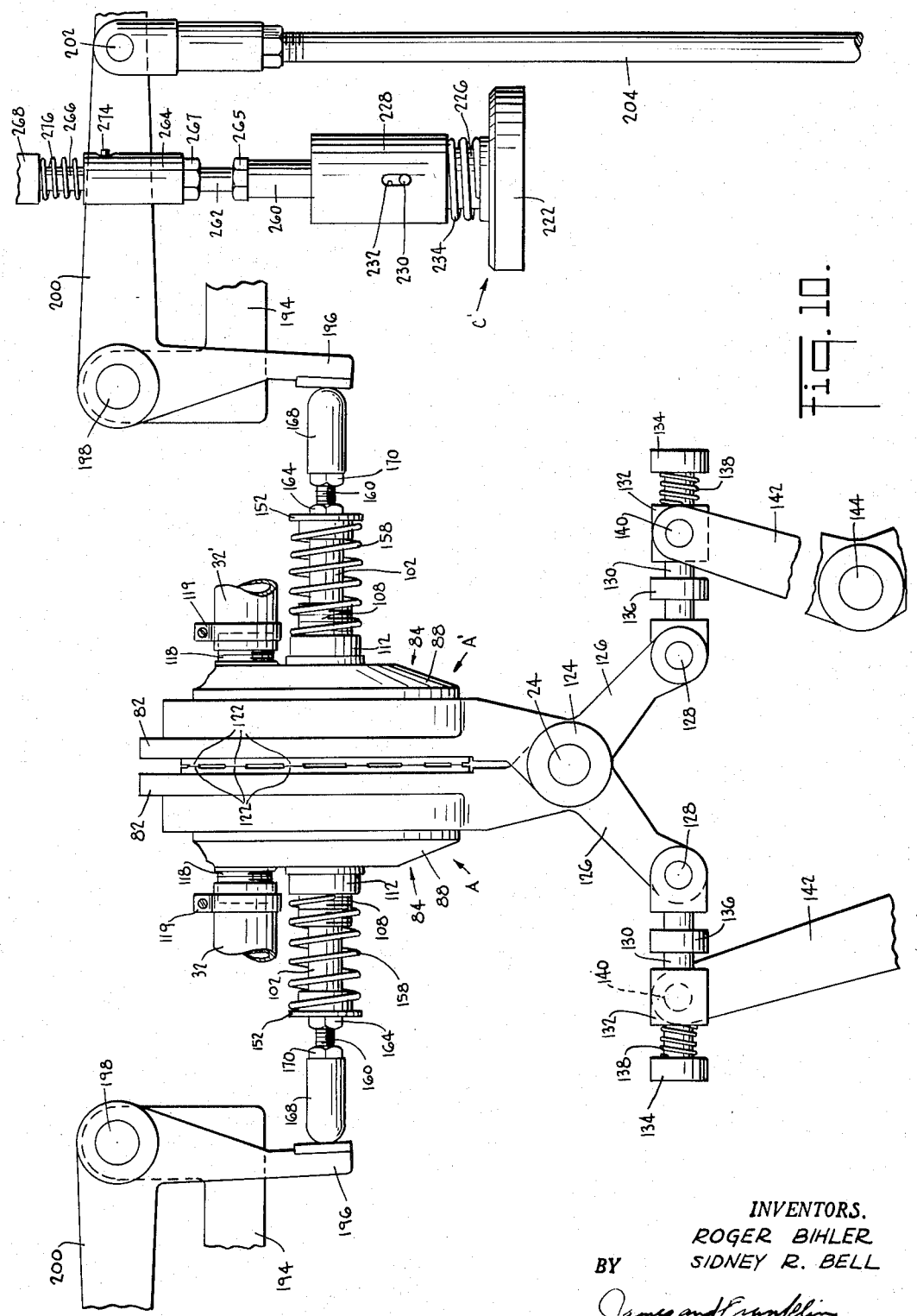

Feb. 7, 1956    R. BIHLER ET AL    2,733,752
MACHINE FOR MANUFACTURING POWDER PUFFS
Filed Aug. 8, 1950    9 Sheets-Sheet 7
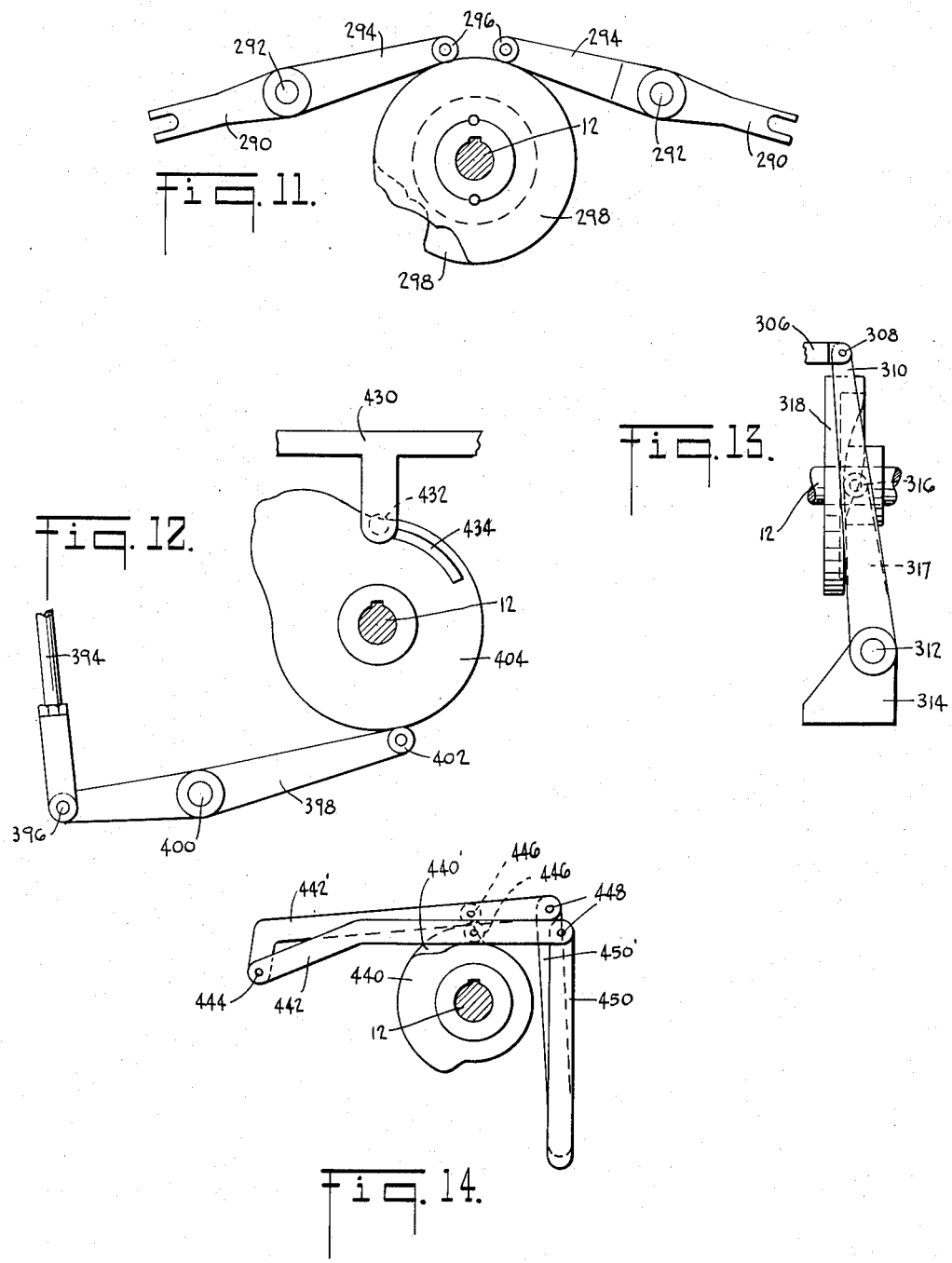
INVENTORS.
ROGER BIHLER
SIDNEY R. BELL
BY
ATTORNEYS

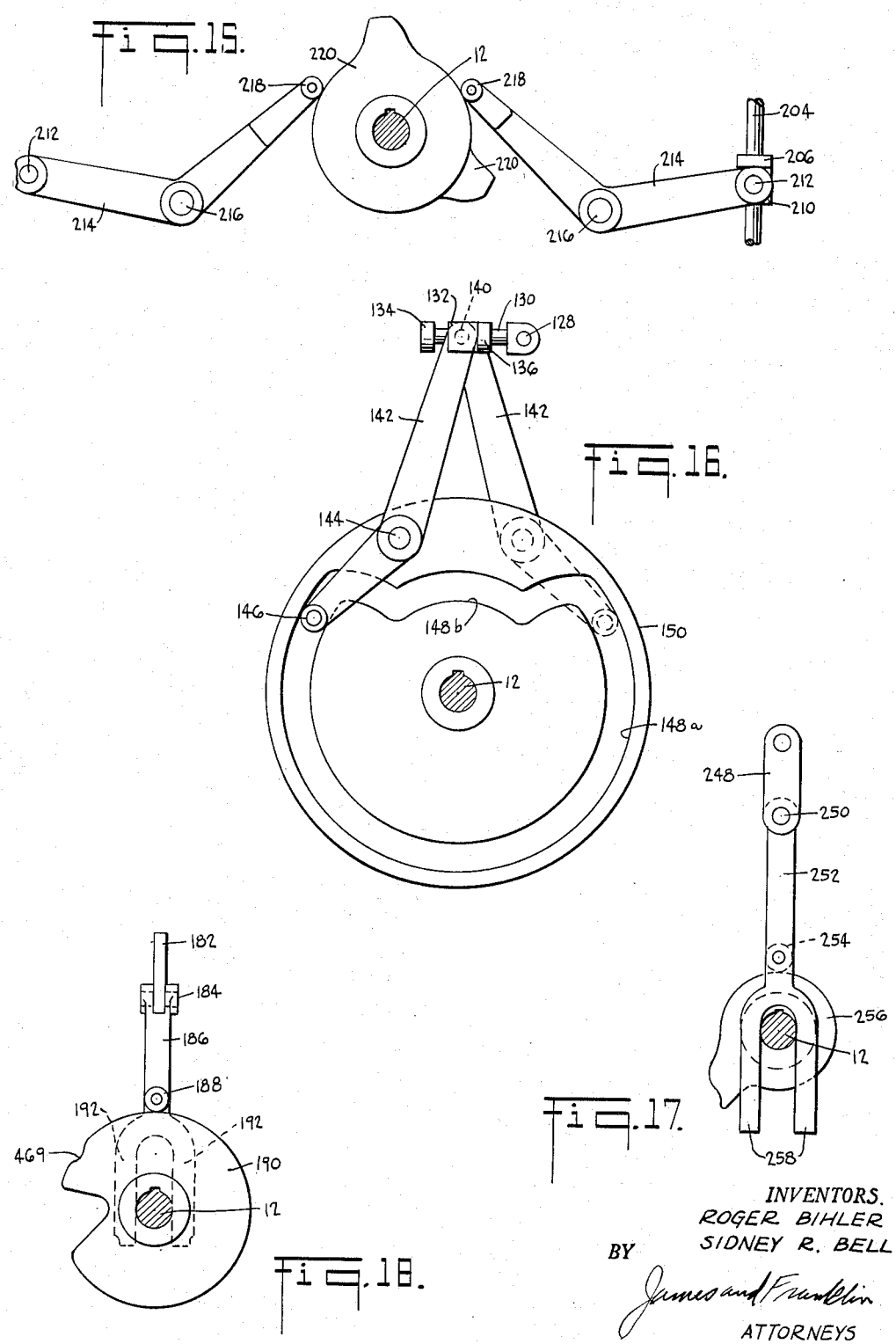

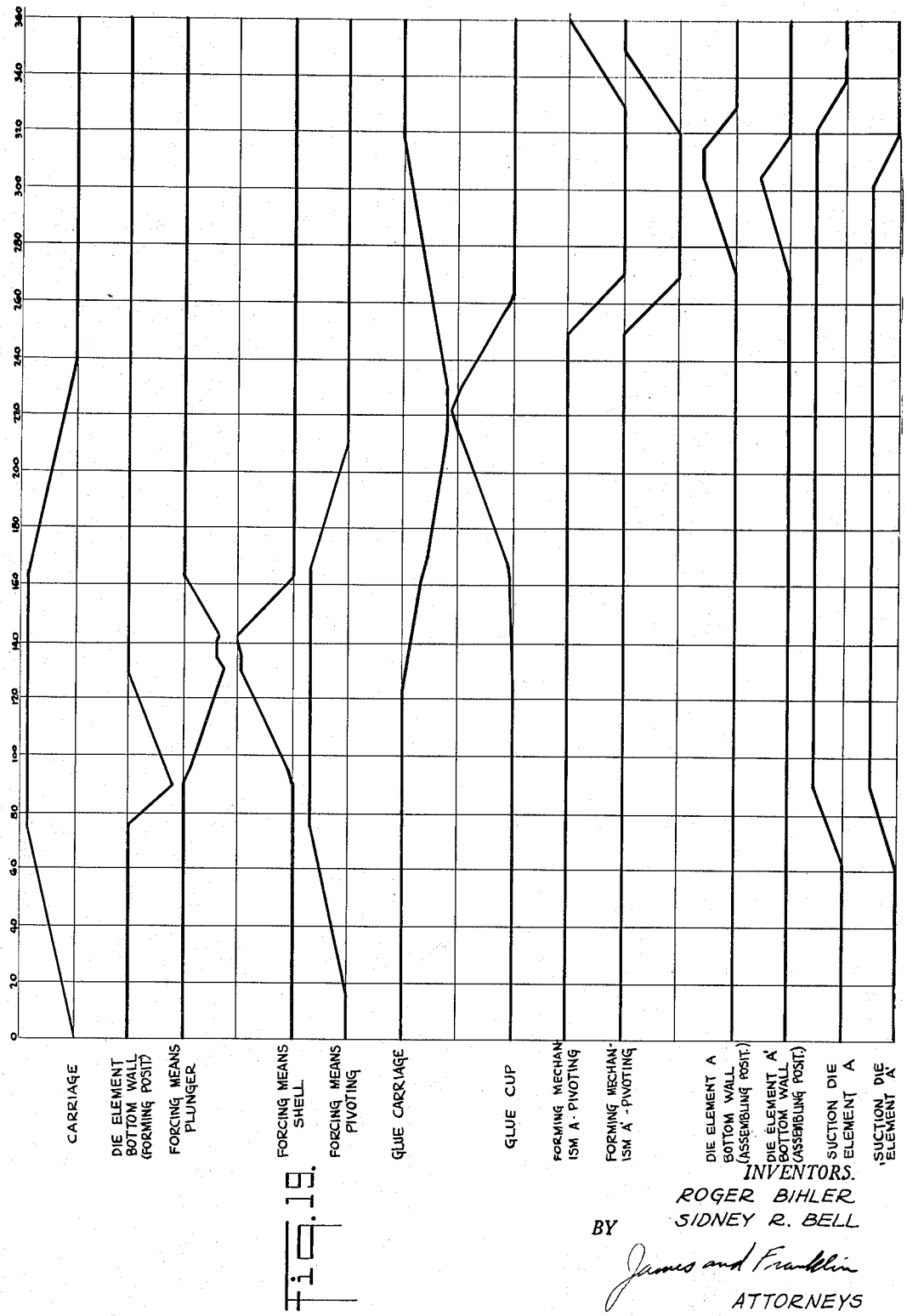

United States Patent Office 2,733,752
Patented Feb. 7, 1956

2,733,752

MACHINE FOR MANUFACTURING POWDER PUFFS

Roger Bihler, Brentwood, N. Y., and Sidney R. Bell, Stamford, Conn., assignors to Victoria Vogue, Inc., New York, N. Y., a corporation of New York Application August 8, 1950, Serial No. 178,234

31 Claims. (Cl. 154—1.8)

The present invention relates to a machine for manufacturing and assembling shaped articles from blanks, and in particular to a machine for manufacturing powder puffs from such blanks, the puffs being formed of a pair of blanks secured together in abutting relationship.

For the application of face powder and for similar uses powder puffs composed of a textile material casing having a tufted or pile outer surface are in wide use. In accordance with prior art constructions and methods the casings are manufactured by taking two blanks and stitching the same together incompletely about the perimeters thereof to form an inside out pocket. A padding or stuffing is provided and the pocket is manually turned right side out by the use of a turning stick or similar projection. After the pocket is turned the open edges are manually connected by stitching or cement. Such construction and methods are subject to several disadvantages. Many of the pockets are damaged in the turning operation. It is difficult to place the stuffing within the pocket so that it lies smoothly. The total number of operations is great with a consequent high labor cost. The turning operation puts the cloth of the casing under excessive strain resulting in many damaged puffs or requiring the use of a heavier material with resultant higher cost. The separate closing of a portion of the edge of the puff casing usually results in a lack of uniformity of the edge and the puckered appearance of the last closed portion detracts from the appearance of the entire puff.

In Epstein and Bihler Patent 2,484,336, a machine is disclosed adapted to shape the individual powder puff casing blanks and to unite those blanks into a finished powder puff. That machine did not automatically perform many of the operations necessary in manufacturing powder puffs of the type under discussion and thus suffered serious drawbacks from the point of view of mass production. For example, manual insertion of the casing blanks and padding or stuffing into the dies consumed considerable time. Since the two dies were located on different levels additional loading difficulties were presented. Operators found it very difficult to properly align the casing blanks within the dies particularly because the pile-like outer surface of those blanks led to shifting of the blanks within the dies. Manipulation of the controls of the machine required a considerable degree of skill and care. The means for in-bending the periphery of the blank, while effective to perform its described function, was nevertheless complicated, expensive and required considerable maintenance. The operator had to manually remove the finished puff from the machine before he could load casing blanks thereinto in order to form the next powder puff. The application of adhesive to the in-bent periphery of each individual casing blank had to be performed manually. All in all, the apparatus there disclosed, although effective to perform its described functions and constituting an advance over prior art hand methods of manufacture, was not conducive to quantity output, required skilled operators, and hence left much to be desired as a piece of production line equipment.

The apparatus of the present invention eliminates the drawbacks inherent in the said prior apparatus and is a fully automatic piece of equipment requiring only that the casing blanks, and the padding or stuffing if used, be loaded on the machine in flat, the machine thereafter automatically performing all of the necessary functions such as inserting the casing blanks and padding into the die elements, in-bending the periphery of the casing blanks, applying adhesive to the said in-bent periphery, uniting the blanks, and automatically ejecting the finished powder puff from the machine. While these cyclical operations are being performed an opportunity is presented to the operator to reload the machine with a new set of casing blanks and padding so that, so long as is desired, the machine can operate continuously, without any loss of time and hence without any diminution of productivity. Only unskilled operators need be employed, since the sole duty of the operator, once the machine is started, is to place the casing blanks on a movable carriage in flat position, an operation requiring little or no skill or training. It is to be noted that this operation is performed at a station relatively remote from the other moving parts of the apparatus so that safety is emphasized.

The operation of the machine presents many novel features. Some of these will now be discussed.

In the machine of Patent 2,484,336 suction is utilized to retain the powder puff casing blank and its associated padding in the die element and to retain the in-bent periphery of the casing blank in bent position. Additional mechanism was employed to positively engage the periphery of the casing blank and in-bend it. In the present machine that additional mechanism is dispensed with, controlled flow of air into the die elements being directed against the periphery of the casing blank and serving to in-bend that periphery. Indeed, the very same suction which acts to retain the casing blank and stuffing in the die element is utilized to cause the flow of air which performs the in-bending function. This results in a material simplification of apparatus without any loss in efficiency and moreover, makes for a neater and cleaner powder puff.

Loading of the machine is facilitated by utilizing a carriage movable between a loading position remote from the die elements and a delivering position above those elements. The carriage is provided with apertures registrable with the open mouths of the die elements, the powder puff casing blanks being slightly larger than said apertures so that they can be placed upon the carriage in flat condition, later being forced through those apertures and into the die elements when the apertures are in registration with the open mouths of the die elements. During the subsequent operations performed upon the casing blanks, such as in-bending, the application of adhesive, and the uniting of the blanks, the carriage is returned to loading position where the operator can place a new set of blanks and padding thereon while the machine is still operating to form the finished powder puff from the blanks and padding of the previous cycle. As a separate and very advantageous feature, the carriage, when returning to delivering position with a new set of blanks thereon, engages the completed powder puff made in the previous cycle of the machine and automatically ejects it from the machine.

While the casing blanks and padding could be forced through the apertures in the carriage and into the die elements manually, it has been found possible to utilize an automatically actuated forcing means positioned on the other side of the carriage from the die elements when the carriage is in delivering position and reciprocable into the apertures of the carriage and preferably through those apertures in order to force the casing blanks and padding into the die elements. The forcing means not only initially positions the casing blanks in the die elements but also, in part of its motion, serves to positively press down the in-bent portions of the periphery of the casing blank after that periphery has been in-bent by the air flow means previously mentioned. This not only ensures that the periphery is completely in-bent, but also makes certain that the periphery is in-bent to such a degree that the suction exerted within the die element will serve to retain the periphery in in-bent condition, thus facilitating the application of glue thereto and the uniting of the two separate blanks. To this end the forcing means is composed of a shell and a plunger independently movable with respect to the shell. It is the plunger which forces the casing blank and padding into the die element and it is the shell which then comes down to engage and positively press the in-bent periphery of the casing blank.

In the form here specifically disclosed the carriage and forcing means cooperate, in conjunction with the application of suction within the die casing, to ensure that the air flow previously mentioned will serve to in-bend the periphery of the blank. The shell snugly fits the aperture in the carriage through which it passes, the shell and plunger cooperate at an appropriate time to prevent the passage of air through themselves, and the carriage is so positioned with respect to the die element that an air passage is defined therebetween. When air can no longer pass through the forcing means or through the aperture in the carriage, air will then flow rapidly through the passage defined between the carriage and the die element, and it is this air flow which serves to in-bend the periphery of the blank.

As an additional feature of the present invention, an automatically operated gluing means is provided which is moved in timed sequence with the other components of the apparatus so as to deposit glue upon the in-bent periphery of the powder puff blanks after that periphery has been positively pressed down by the forcing means and is held down through the use of suction.

The die elements are movable between a forming position in which their open mouths are exposed and an assembling position in which their open mouths abut. Motion from forming to assembling position is automatically accomplished in timed sequence in the cycle of operation of the machine. The die elements are preferably provided with movable bottom walls, those walls moving toward one another when the die elements are in assembling position so as to press the two blanks together with their glued surfurfaces abutting, in this manner uniting the two blanks into a completed powder puff. When the die elements are then moved back to forming position means are provided in one of these elements for retaining the united powder puff blanks therein. This means may be the same suction which previously held the casing blank in the die element and held the in-bent periphery of that blank down in in-bent position. Before the carriage next returns to delivering position, close to the open mouth of the die element in which the united powder puff blank is retained, the bottom wall of that element is moved upwardly toward its open mouth, thus causing the completed powder puff to project well above the open mouth so that it can be engaged by the carriage and pushed out of the die element and into an ejection chute. A flow of compressed air against the underside of the blank may facilitate ejection.

According to another aspect of the present invention, the bottom wall of the die element is moved in timed relation with the forcing means so as to facilitate passage of the powder puff casing blank from its loaded position in flat on top of the carriage downwardly through the aperture in said carriage and into the die element. To this end the die element bottom wall, at the beginning of the operative motion of the forcing means, moves up to meet the forcing means and to positively grasp the casing blank and padding between itself and the forcing means, the two thereafter moving down together so as to carry the casing blank and padding into the die element rather than push it thereinto. Means are provided on the bottom wall of the die element for grasping the casing blank and preventing it from shifting its position, thus ensuring that it is properly oriented in the die element and that its periphery along the sides of the die element is in position to be acted upon and in-bent by the air flow previously mentioned.

All of the components of the machine are assembled in a sturdy and efficient manner so that the machine is compact, dependable, comparatively noiseless, and exceedingly effective. It may be controlled by a single switch and may operate continuously and fully automatically, except for loading, so long as supplies of casing blanks and padding are available. All of the components of the machine cooperate to produce a neat and immediately saleable powder puff at minimal cost. It will be apparent that one or more of said components could be eliminated, the function of those components being performed manually, without materially affecting the operation of and cooperation between the remaining components.

To the accomplishment of the above objectives, and to such other objectives as may hereinafter appear, the present invention relates to the construction and operative relation of the various machine components assembled in a machine of the type here involved, as defined in the appended claims and as described in this specification taken together with the accompanying drawings in which:

Fig. 3 is a fragmentary top plan view of the left hand portion of the machine of Fig. 1 with the die elements in forming position, the carriage in delivering position over the die elements, and the forcing means in operative position over the die elements;

Fig. 4 is a cross-sectional view on an enlarged scale showing one die element, a portion of the carriage and one of the forcing means in their position as shown in Fig. 3;

Figure 1:
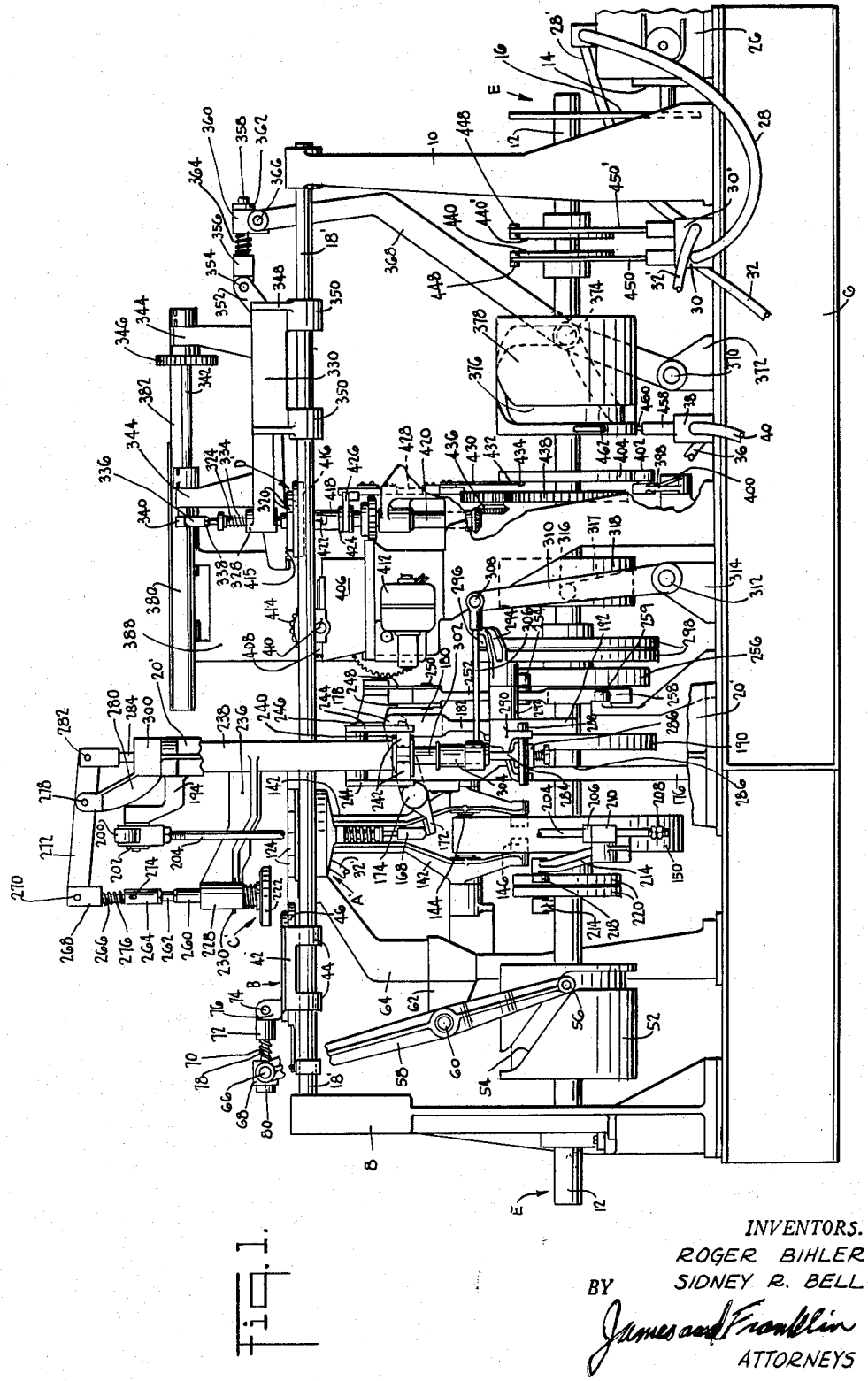
Fig. 1 is a side elevational view, with parts of the frame broken away, of the machine of the present invention, showing that machine at the beginning of its cycle.

Figs. 5, 6, 7 and 8 are side cross-sectional views, on a reduced scale, of the components of Fig. 4 showing those components in various positions which they assume during the forcing of the powder puff casing blank into the die casing (Figs. 5 and 6), the in-bending of the periphery of the blank by means of flow of air (Fig. 7), and the positive downward pressing of that in-bent periphery (Fig. 8).

Fig. 9 is an end view, partially in cross-section and with parts broken away, showing a portion of the machine after the operation illustrated in Fig. 8, the two die elements being in forming position and the gluing means being in position for depositing glue on the in-bent periphery of the casing blank;

Fig. 10 is a side elevational view of the die elements in assembling position, which position they will assume after the operation disclosed in Fig. 9;

Fig. 11 is a fragmentary view showing the cams and part of the linkages employed for moving the plungers of the forcing means;

Fig. 12 is a fragmentary view of the cam and part of the linkage employed for reciprocating the gluing means cups when said gluing means is in its glue-depositing position, and for reciprocating the cleaners for the cups when the gluing means is in another position;

Fig. 13 is a fragmentary view of the cam and part of the linkage for swinging the forcing means between operative and inoperative position;

Fig. 14 is a fragmentary view of the cams and linkages employed for controlling the application of suction within the die elements;

Fig. 15 is a fragmentary view of the cams and part of the linkages employed for moving the bottom walls of the die elements when those elements are in assembling position;

Fig. 16 is a fragmentary view of the cam and part of the linkages employed for moving the die elements between forming and assembling positions;

Fig. 17 is a fragmentary view of the cam and part of the linkages employed to move the shell of the forcing means;

Fig. 18 is a fragmentary view of the cam and part of the linkages employed to move the bottom walls of the die elements when those elements are in forming position; and Fig. 19 is a graphical representation of the surfaces of the various cams, illustrating the manner in which movement of the various components is coordinated.

GENERAL DESCRIPTION

The apparatus of the present invention comprises a plurality of operative components arranged and movably mounted on a suitable frame. These components include a pair of forming mechanisms A, A' movable between a forming position in which their open mouths are exposed (Figs. 1–9) and an assembling position in which their open mouths abut (Fig. 10). Individual powder puff casing blanks are movable into the forming mechanisms A, A' so as to take a desired configuration, and when the forming mechanisms A, A' are moved to assembling position these two blanks are united so as to form a completed powder puff. A carriage B is movable between a loading position (Figs. 1 and 2) remote from the forming mechanisms A, A' when those mechanisms are in forming position, and a delivering position over the exposed open mouths of the forming mechanisms A and A' (Figs. 3–8). The individual powder puff casing blanks are placed upon the carriage B when that carriage is in loading position, the carriage being suitably shaped so as to facilitate placing of the blanks thereon in accurately oriented position, the carriage B, in moving to delivering position, carrying the blanks therewith and accurately positioning them over the exposed open mouths of the forming mechanisms A, A' so that they can be forced into the forming mechanisms A, A' in a convenient and accurate manner. Forcing means C, C' are provided for automatically forcing the blanks from the carriage B into the forming mechanisms A, A'. The forcing means C, C' are movable between an inoperative position remote from the forming mechanisms A, A' (Figs. 1, 2 and 10) and an operative position over the carriage B in delivering position and the forming mechanisms A, A' in forming position (Figs. 3–8). When the forcing means, C, C' are in operative position they are movable toward the open mouths of the forming mechanisms A, A' so as to force the powder puff blanks from the carriage B into the forming mechanisms A, A' (Figs. 5–8), the forcing means C, C' then being movable away from the open mouths of the forming mechanisms A, A' so as to permit the carriage B to return to loading position and permit the forcing mechanisms C, C' themselves to be returned to inoperative position. Gluing means D, D' are provided, those means being movable between a glue-obtaining position remote from the forming mechanisms A, A' (Figs. 1 and 2) and a glue-depositing position over the open mouths of the forming mechanisms A, A' (Fig. 9), the gluing means D, D' in glue-depositing position being reciprocable toward and away from the forming mechanisms A, A' so as to deposit glue upon the blanks held therein. The gluing means D, D' are then returned to a position remote from the forming mechanisms A, A', after which said forming mechanisms A, A' are moved to assembling position (Fig. 10), the blanks on the outer surfaces of which glue has already been deposited being thereby united. When the forming mechanisms A, A' are again moved to forming position, means are provided for retaining the united powder puff blank in a given one of the forming mechanisms, here shown as the forming mechanism A. In the beginning of the next cycle of operation of the machine, when the carriage B again moves from loading to delivering position, carrying with it a new set of powder puff blanks which have been placed thereon by the operator, it will automatically eject the united powder puff blank formed in the previous cycle.

When powder puff blanks of the type specifically illustrated in Patent 2,484,336 are utilized, each of these blanks comprising a casing element 2 having a diameter greater than that of the forming recesses in the forming mechanisms A, A', and a wad of padding or stuffing 4 receivable therein, it is desired that the periphery of the casing element 2 be in-bent over the padding or stuffing 4, glue or other suitable adhesive being applied to the upper surfaces of the in-bent periphery of the casing element 2 and the two blanks being united by causing the glued surfaces of the in-bent peripheries of the individual casing elements 2 to come in contact with one another. Novel means are provided for accomplishing this in-bending step, said novel means utilizing no additional mechanism, the in-bending being accomplished through the flow of air into the forming mechanisms A, A' in a direction such that the air will impinge against the upstanding periphery of the casing element 2 and in-bend that periphery. In accordance with the teachings of Patent 2,484,336, suction is applied within the forming mechanisms A, A' in order to retain the powder puff blanks therein, and according to a specific aspect of the present invention, the same suction is utilized to provide for the flow of air which causes the in-bending.

All the movable operative components of the machine are operatively connected to a driving means generally designated E, said driving means E moving the various components and controlling the application of suction (and compressed air, if utilized) in proper timed sequence during each cycle of the apparatus.

Two sets of casing elements 2 and padding 4 are placed upon the carriage B at the beginning of each cycle. At the end of each cycle a finished powder puff is delivered by the machine, that powder puff consisting of two united blanks, each blank comprising a wad of padding 4 the exposed surfaces of which are completely covered by its associated casing element 2, the periphery of each of the casing elements 2 being in-bent over the tops of the padding 4 and being secured together by means of the glue or other adhesive deposited thereon by the gluing means D, D'.

The supporting frame of the apparatus may comprise a sturdy bed plate 6 upon which all of the components of the machine are mounted. A pair of standards 8 and 10 extend upwardly from each end of the bed plate 6 to an appropriate height, that height preferably being such that a seated operator can have ready access to the top of the apparatus. A cam shaft 12 is journaled in the lower portions of the standards 8 and 10, that shaft being rotated by motor 14 via operative connection 16 which may take the form of a sprocket chain, belt, gear train or the like, the motor being mounted on the bed plate 6. At the top of the standards 8 and 10 a pair of spaced horizontal guide rods 18, 18' are mounted, the carriage B and gluing means D, D' being slidable along those guide rods between their various positions. Vertical standards generally designated 20 and 20' are positioned outside the guide rods 18, 18', the forcing means C, C' being mounted thereon so as to pivot about a vertical axis between their inoperative and operative positions and so as to be slidable reciprocably in a vertical direction when in operative position. A cross bar 22 extends between the guide rods 18, 18' adjacent the vertical standards 20, 20' (see Figs. 2 and 3) and a horizontal shaft 24 extends at right angles thereto, the forming mechanisms A, A' being pivotally mounted on the shaft 24 so as to be movable between forming and assembling positions. The shaft 24 is approximately on the same level as the guide rods 18, 18' so that the carriage B and the gluing means D, D' can be guided by the rods 18, 18' in their motion without being obstructed. It will be noted that the loading position of the carriage is on one side of the forming mechanism A, A', while the glue-obtaining position of the gluing means D, D' is on the other side thereof.

Also mounted on the bed plate 6 in an air suction pump 26 the suction end of which is connected, by means of conduits 28, 28', to two valves 30, 30', the valves in turn being connected by means of conduits 32, 32' to the forming mechanisms A, A'. It may be desired for some purposes, as will be explained more in detail hereinafter, to utilize compressed air in addition, and if this is the case, a suitable air compressor 34, appropriately driven in any convenient manner, may also be mounted on the bed plate 6, the air pressure outlet of which is connected by means of conduit 36 to valve 38, the valve in turn being connected by conduit 40 to at least one of the forming mechanisms A, A'.

The remainder of the structure consists of the details of the various components of the machine and of the various cams and linkages utilized for moving or actuating those components. They will now be described in detail, component by component, after which the detailed mode of functioning and cooperation of the various components will be described.

*The carriage*

The carriage B comprises a plate 42 extending between the guide rods 18, 18' and having ears 44 on either end thereof encompassing the guide rods 18, 18' so that the carriage is slidable therealong. The plate 42 is provided with a central raised portion 45 adapted to clear the shaft 24 when the carriage is in delivering position, and on either side of the raised portion 44 are a pair of generally circular enlargements 46, 46' each having an aperture 48 therein smaller than the diameter of the casing element 2, a recess 50 being formed in the upper surface of the portions 46, that recess having a diameter closely similar to that of the casing element 2. Thus the casing element 2, may be placed on the carriage B in flat condition, being snugly received within the recess 50. The wad of padding 4 which may also form a part of the powder puff casing blank is of a diameter somewhat smaller than that of the aperture 48, so that the padding 4 and casing element 2 can, at an appropriate time, be forced through the aperture 48, the periphery of the casing element 2 extending beyond the padding 4 being bendable up around the side edges of the padding 4 in that operation.

Figure 2:
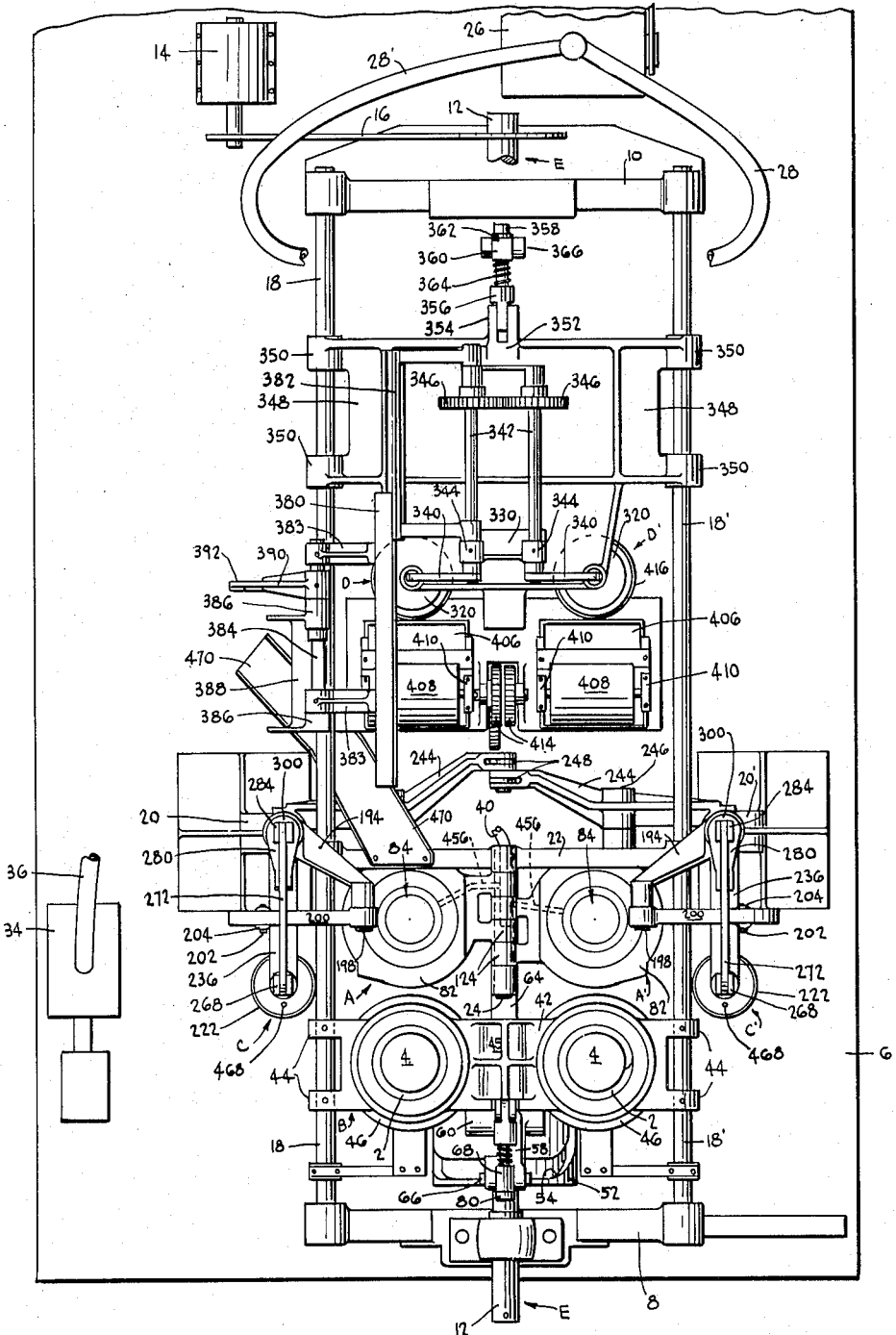
Fig. 2 is a top plan view of the machine of Fig. 1.

The carriage B is shown in Figs. 1 and 2 in its loading position remote from the forming mechanisms A and A'. It will be noted that in this position the carriage B is freely accessible from the top thereof and is not interfered with by any of the other components of the apparatus. Consequently the casing elements 2 and wads of padding 4 which constitute the individual powder puff casing blanks can readily be placed thereon by the operator, the recesses 50 ensuring that the blanks are properly aligned and positioned.

The carriage B is illustrated in Figs. 3–8 in its delivering position. In this position the carriage B is so placed that the apertures 48 are in accurate registration with the forming mechanisms A, A', and hence when the powder puff casing blanks are forced through the apertures 48 they are properly aligned with and move properly into the forming mechanisms A, A'.

For moving the carriage (see Figs. 1 and 3) a cam 52 is rotatable with the cam shaft 12, that cam having an appropriately shaped track 54 therein in which follower 56 rides. The follower is positioned at one end of arm 58, that arm being pivoted at 60 on an ear 62 extending from intermediate standard 64, and the other end of the arm being pivotally connected at 66 to a collar 68 slidable on pin 70, that pin in turn being received within collar 72 pivotally connected at 74 to ears 76 which are a part of the carriage B. A spring 78 is interposed between the collars 72 and 68, and a positive stop 80 is provided at the end of the pin 70 so as to prevent the collar 68 from being urged off therefrom through the action of the spring 78.

When the cam 52 is rotated the arm 58 will be pivoted about the axis 60 and hence the carriage B will be slid along the guide rods 18, 18' between its loading and delivering positions, the spring 78 acting as a shock absorber and relief means in the drive linkage to ensure smooth operation and to provide for emergencies.

*Forming mechanisms*

The forming mechanisms A and A' may be substantially identical and consequently a detailed description of one will suffice for both. (See Fig. 4.) Each comprises a ring-like support 82 in which a die element generally designated 84 is secured as by means of set screws 86. Each die element 84 comprises a supporting shell 88 with a ring 90 secured therein the accurately dimensioned inner surface 92 of which defines the side wall of the die element 84, that die element having an open mouth and a bottom wall 94. While the bottom wall 94 may be fixed with respect to the ring 90, it has been found desirable, in order to accomplish various functions hereinafter to be described, that the bottom wall 94 of one, or preferably of both, of the die elements 84 be movable toward and away from the open mouth of the die element. Hence the bottom walls 94 of the die elements 84 are here illustrated in the form of disc-like plungers snugly fitting within the rings 90, having a tapering upstanding rim 96, and having a central apertured hub 98 into which the tip 100 of rod 102 is receivable, the bottom wall 94 being secured to the rod by means of a set screw 104 engageable with a peripheral groove 106 in the tip 100. The rod 102 is slidable within bushing 108 threadedly secured inside central hub 110 of the outer casing 88 and locked in position by means of lock nut 112.

The bottom wall 94 is provided with a plurality of orifices 114 extending therethrough and into a chamber generally designated 116 between itself and the casing 88. The casing 88 is provided with bushing 118 snugly secured therein, to which bushing the conduits 32, 32' from the suction pump 26 are secured as by means of clamps 119 (see Fig. 10). Consequently, whenever the suction pump 26 is in operation and the valves 30 or 30' are open, suction will be exerted within a chamber 116 in the appropriate forming mechanism A or A' and hence air will flow through the passages 114 in the bottom wall 94 from the top thereof to the bottom. The bottom wall 94 is also provided with a ring of upstanding pins 120 which extend toward but, in the normal position of the plunger 94, below the open mouth of the die element 84. The purpose of these pins 120 is to grasp the casing blank 2 when that blank is moved into the die element and prevent it from shifting its position. This problem is particularly critical, when, as is usually the case, the outer surface of the casing blank 2 has a tufted or pile characteristic.

The upper surface of shell 88 is preferably provided with a series of thin spaced projections 122 (see Fig. 4) for a purpose hereinafter to be explained.

Each of the supports 82 are provided with spaced ears 124, the ears 124 of the forming mechanism A fitting between the ears 124 of the forming mechanism A' and the ears as thus interfitted being received over shaft 24 so that the shaft 24 constitutes a pivotal axis for the forming mechanisms A and A', those mechanisms being pivotable about the shaft 24 between forming position in which they are on opposite sides of the shaft 24 and in which their open mouths are parallel and in line (Fig. 3), and assembling position in which they are both on the same side of the shaft 24 and their open mouths abut (Fig. 10).

In order to provide for motion of the forming mechanisms A and A' between their forming and assembling positions, each of the supports 82 is provided with a descending arm 126 adjacent the rings 124. Pivotally secured to the ends of each arm by means of pin 128 is rod 130 on which sleeve 132 is slidable between stops 134 and 136, a compression spring 138 being interposed between the sleeve 132 and the stop 134. Pivotally secured to the sleeve 132 by means of pin 140 is one end of operating arm 142, that arm being pivotally mounted on stub shaft 144 suitably supported on the frame of the machine, as by the intermediate standard 64, the other end of the arm 142 carrying a cam follower 146 movable within cam track 148 in cam 150 rotatable with the cam shaft 12. Since each forming mechanisms A and A' is provided with an individual linkage, the cam 150 is provided with a pair of substantially identical cam tracks, one on each side surface (see Figs. 1 and 16). When the cam followers 146 are in the outer portion 148a of the cam tracks the forming mechanisms A and A' will be positioned in forming position, and when the cam followers 146 are in the inner portion 148b of the cam tracks the forming mechanisms A and A' will be in assembling position.

In order to control the movement of the plunger-like bottom wall 94 of the die element 84, the outwardly projecting end of the rod 102 has a collar 152 secured thereon by means of set screw 154 receivable in groove 156 on the rod 102, a compression spring 158 being interposed between the collar 152 and the bushing 108 (Fig. 4) or the lock nut 112 (Fig. 10) so as to urge the rod 102 outwardly with respect to the shell 88, thus urging the bottom wall 94 away from the open mouth of the die element 84. A screw 160 is adjustably threadedly received inside an axial aperture 162 in the projecting tip of the rod 102, being held in adjusted position by means of lock nut 164. The screw 160 is threadedly received within axial orifice 166 of tip member 168, the tip member being secured in proper position thereon by means of lock nut 170.

When the forming mechanisms A and A' are in forming position the tip members 168 rest upon tappets 172 (see Fig. 1) pivotally mounted at 174 on an intermediate standard 176, a tappet 172 being provided on each side of the apparatus for each of the forming mechanisms A and A'. The other ends 178 of each of the tappets are secured to forked tips 180 on a vertical slidable rod 182 (see Figs. 1 and 18), the lower end of that rod being pivotally connected at 184 to a member 186 having a cam follower 188 thereon which rides on the periphery of a cam 190 rotatable with the cam shaft 12. In order to guide the member 186 it is provided with forked lower extensions 192 which encompass and are vertically slidable with respect to the cam shaft 12. As the cam follower 188 moves up and down following the peripheral configuration of the cam 190 the tappets 172 engaging the tip members 188 are pivoted, the rods 102 and the plunger-like die element bottom walls 94 being moved up and down in conformity therewith.

In order to move the die element bottom walls 94 when those die elements are in their assembling position (see Fig. 10), fixed arms 194 are provided on the vertical standards 20 and 20' and tappets 196 are pivotally mounted therein at 198, the actuating arms 200 (see Figs. 2, 3 and 10) rigidly attached to those tappets 196 extending outwardly at right angles thereto and being pivotally connected at 202 to a link 204 of adjustable length the bottom ends of which (see Figs. 1 and 15) are provided with a fixed top stop 206 and an adjustable bottom stop 208 between which collar 210 is slidable, that collar being pivotally connected at 212 with one end of bent lever arm 214, said lever arm being pivotally connected to the frame of the apparatus at 216 and its other end carrying a cam follower 218 which bears against the periphery of cam 220 rotatable with the cam shaft 12. As here disclosed, two cams 220 are provided, one to control each of the tappets 196. As the cam followers 218 are moved in toward and out from the cam shaft 12 by following the periphery of the cams 220, the links 204 are moved up and down and the tappets 196 are therefore moved in and out, engaging the tip members 168 and moving the plunger-like bottom walls 94 toward and away from the open mouths of the die elements 84.

*Forcing means*

Two forcing means C and C' are here disclosed, one for each of the die elements forming mechanisms A and A'. A description of one will suffice for both.

Each of the forcing means C and C' (see Fig. 4) comprises a cup-like shell 222 and a plunger 224 snugly receivable in the shell and independently movable with regard thereto. The outer dimensions of the shell 222 are such that it will pass through the aperture 48 in the carriage B, preferably snugly filling that aperture, and will also be movable into the open mouth of the die element 84, preferably being snugly received between the side walls 92 thereof. The plunger 224 is necessarily smaller in outer dimension than the shell 222 and is preferably of a size comparable to that of the wad of padding 4 which forms a part of the powder puff blank.

The shell 222 is secured to a hollow hub 226 receivable within collar 228 and vertically slidably therewithin to a limited degree as determined by the movement of pin 230 secured to hub 226 within slots 232 in the sides of the collar 228. A spring 234 is interposed between the collar 228 and the shell 222 so as to constantly tend to resiliently urge the shell 222 outwardly with respect to the collar 228. The collar 228 is in turn secured to arm 236 (see Figs. 1, 2 and 3) which is in turn secured to sleeve 238 (see Fig. 1) on vertical standard 20 or 20', vertically slidable with respect to said standard, and rotatable with respect thereto about its longitudinal axis. The lower end of the sleeve 238 is provided with a ring 240 and pins 242 are received within said ring, the pins being mounted on the ends of arms 244 which are intermediately pivotally mounted on the frame at 246 and which extend inwardly so as to be pivotally secured to links 248 (see Figs. 1 and 17) which are in turn pivotally secured, at 250, to vertical arm 252, that arm having a cam follower 254 which rides on the periphery of cam 256 which is rotated with cam shaft 12. The lower end of the arm 252 is provided with forked extensions 258 which encompass the cam shaft 12 and which are vertically slidable with regard thereto so as to steady and guide the arm 252, member 259 secured to the bed plate 6 further guiding the extensions 258. Consequently, as the cam follower 254 is raised and lowered by following the peripheral configuration of the cam 256, the arms 244 will be pivoted, the ring 240 will be lifted and lowered and hence the shell 222 will be lifted and lowered, the spring 234 providing for shock absorption and relief.

Separate mechanism is provided for moving the plunger 224 independently of shell 222. Plunger 224 is secured (see Fig. 4) by means of screw 258 to shaft 260 freely vertically slidable through the hub 226 of the shell 222 and through the sleeve 228, the shaft 260 extending out through the top of the sleeve 223 (see Figs. 1 and 10). A rod 262 extending upwardly therefrom and fixed thereto by lock nut 265 is fixedly secured within sleeve 264 by lock nut 267, the other end of the sleeve 264 being secured to rod 266 which depends from link 268 pivotally secured at 270 to the arm 272. The sleeve 264 has a slight degree of play with respect to the pin 266, as defined by a pin and slot interconnection 274, and a spring 276 between the sleeve 264 and the link 268 serves to urge the sleeve 264 away from the link 268. The arm 272 is pivotally mounted at 278 in an arm 280 (see Figs. 1, 2 and 3) the mounting of which will be described more in detail later. The other end of arm 272 is pivotally connected at 282 to link 284 which extends downwardly through the center of the vertical standards 20 and 20' (see Fig. 1) and which is vertically slidable therethrough. The lower end of the link 284 is provided with a ring 286 engaged by pin 288 in the forked arm 290 (see Figs. 1 and 11) pivotally mounted at 292 on the frame, the other end 294 of the arm having a cam follower 296 which engages with the periphery of cam 298 rotatable with the cam shaft 12. Two cams 298 are provided, and two sets of linkages are provided, each for moving the plunger 224 in one of the forcing means C or C'. As the cam follower 296 is moved up or down so as to conform to the periphery of the cam 298 the arm 294 is pivoted, the link 284 is lifted or dropped, the shaft 260 is correspondingly lowered or raised, and the motion of the plunger 224 conforms thereto. The spring 266 provides for shock absorbing and relief.

The forcing means C, C' must be operatively positioned over the forming mechanisms A, A' when those mechanisms are in forming position if the forcing means C, C' are to perform their desired function of moving the powder puff casing blanks into the die elements 84. Also, the forcing means C, C' must be moved to an inoperative position remote from the forming mechanisms A and A' in order to permit those mechanisms to move to assembling position. In the apparatus here disclosed this is accomplished by pivoting the forcing means C, C' about a vertical axis between an operative position over the forming mechanisms A, A' and an inoperative position outside those forming mechanisms.

To accomplish this the arm 280 on the end of which the arm 272 is pivotally mounted is secured to a collar 300 (see Figs. 1, 2 and 3) which rests on the fixed portion of the standard 20 or 20' and which is rotatable with respect thereto about a vertical axis. The collar 300 is secured to a hollow shaft 302 which extends vertically through the standards 20 or 20' inside the hollow shaft 238 and outside the link 284. The lower end of the shaft 302 has a collar 304 rigidly secured thereto, that collar having an arm extending outwardly therefrom and pivotally secured to link 306 (see Figs. 1 and 13) the other end of which is pivotally secured at 308 to lever 310 the bottom of which is pivotally secured at 312 to an ear 314 which forms a part of the bed plate 6. A cam follower 316 is carried by the arm 317 movable therewith, that follower engaging the side cam surface of a cam 318 rotatable with cam shaft 12. As the cam 318 rotates the cam follower 316 is moved to one side or the other as viewed in Figs. 1 and 13, thus causing the arms 317 and 310 to pivot and moving the link 306 back and forth. This causes rotation of the shaft 302 and of the collar 300, thus causing the arm 280 to pivot about the axis of the shaft 302 and carry with it the arm 272, causing that arm to pivot about the vertical axis of the link 284, that link being coaxial with the shaft 302. Rotation of the link 284 is permitted by reason of the ring-pin interconnection 286, 288 at its lower end. This tends to swing the plunger 224, and since the plunger 224 is retained within the shell 222, the shell 222 follows. This causes pivoting of the arm 236, that pivotal motion being permitted because of the ring-pin interconnection 242 at the lower end of the shaft 238 to which the arm 236 is secured, the shaft 238 being coaxial with the shaft 302 and the link 284.

Hence rotation of the cam 318 serves to pivot the forcing means C, C' to operative position over and aligned with the open mouths of the forming mechanisms A and A' when those forming mechanisms are in forming position and over and aligned with the apertures 48 in the carriage B when that carriage is in delivering position, movement of the cams 298 and 256 serving to reciprocate the plunger 224 and shell 222 respectively of the forcing means C and C' when the forcing means C, C' are in operative position.

*Gluing means*

The gluing means D and D' are similar in construction and a description of one will suffice for both. Each consists of a cup-shaped member 320 the downwardly depending flange 322 of which is approximately the same shape and size as the in-bent periphery of the powder puff casing elements 2. These cups 322 are adapted to be moved from a glue-receiving position in which the exposed lower surface of the flange 322 have a film of glue or other adhesive placed thereupon and a glue-depositing position in which the cups 320 are positioned over the powder puff casing blanks and are then reciprocated toward and into contact with said blanks and then away so as to deposit the glue on the upper surfaces of the in-bent peripheries of casing elements 2 while those elements are still in the forming elements A and A'.

To this end each of the cups 320 is secured to a rod 324 (see Fig. 9), as by the set screw 326, that rod being vertically reciprocable in hub 328 on carriage 330. The rod has a collar 332 secured thereto above the hub 328, and a spring 334 active between the collar 332 and hub 328 tends to force the rod 324 upwardly carrying with it the cup 320. Threadedly received on the upwardly projecting rod 324 is tip member 336, held in position by means of lock nut 338, that tip bearing against tappet 340 secured to shaft 342 rotatably mounted in ear 344 projecting upwardly from the carriage 330. Secured to the shafts 342 are meshing gears 346, thus ensuring that motion of one tappet 340 imparts corresponding motion to the other tappet 340.

The carriage 330 has downwardly and laterally extending portions 348 terminating in collars 350 (see Figs. 1 and 2) which encompass the guide rods 18, 18' so that the carriage is slidable therealong. A rearwardly projecting arm 352 is pivotally secured at 354 to link 356 having pin 358 extending therefrom. A collar 360 is slidably mounted on the pin, being prevented from moving off therefrom by means of stop element 362, and a spring 364 is interposed between the collar 360 and the link 365 so as to urge the two away from one another. Secured at 366 to the collar 360 is arm 368 (see Fig. 1) the other end of which is pivoted at 370 to an ear 372 mounted on the bed plate 6, the arm 368 bearing along its length a cam follower 374 movable in cam track 376 on cam 378 mounted on the cam shaft 12. As the cam 378 is rotated the cam follower 374, moving in the cam track 376, causes the arm 368 to swing about the horizontal axis 370, thus sliding the carriage 330 along the guide rods 18, 18' from one extreme position shown in Figs. 1 and 2 to another extreme position shown in Fig. 9. The spring 364 acts as a shock absorber and relief mechanism. As the carriage 330 is moved the cups 320 move therewith.

A horizontally extending channel-shaped member 380 is positioned on one side of the carriage 330 and level with one of the tappets 340, a bar 382 secured to that tappet 340 being slidable in the channel of the member 380. The member 380 is mounted on the ends of arms 383 (see Fig. 2) secured to shaft 384, that shaft being journalled in bearings 386 appropriately secured on an upstanding support 388. Also affixed to the shaft 384 is an arm 390 extending laterally therefrom, the outer end of which is pivotally secured at 392 to a link 394 (see Fig. 12) the lower end of which is pivotally connected at 396 to an arm 398 pivotally mounted at 400 on a rigid extension of the bed plate 6, the other end of the arm 398 carrying a cam follower 402 which rides on the periphery of cam 404 secured to the cam shaft 12. As the cam 404 rotates the cam follower 402 moves up and down thus pivoting the arm 398, moving the link 394 up and down, pivoting the arms 390, causing the shaft 384 to rotate, and thus causing the channel-shaped member 380 to move up and down. This positively moves the tappet 340 carrying the bar 382 up and down causing reciprocation of cup 320. The gears 346 cause the other tappet 340 to have a similar motion, thus moving the other cup 320 in a corresponding manner.

A pair of glue pots 406 are provided within which a supply of appropriate adhesive is maintained. Drums 408 (see Figs. 1 and 2) are mounted for rotation in bearings 410 so that the lower portion of the drums extend into the supply of glue in the pots 406 while the upper portions of the drums are slightly below the lower surfaces of the flanges 322 of the cups 320. A motor 412, through an appropriate gearing mechanism 414, maintains the drums 408 in constant rotation so that the film of adhesive carried by the drums is constantly maintained in fluid condition. Gears 412 are operatively connected to the drums 408, and the underside of the carriage 330 is provided with a rack 415 (see Figs. 1 and 9) engageable with the gears 414 when the carriage 330 is moved thereover. A clutch arrangement is provided so that, when the carriage 330 is being moved toward glue-depositing position the gears 414, driven by the rack 415 in accordance with the motion of the carriage 330, will drive the drums 408 at that speed, the drums contacting the lower surfaces of the flanges 322 of the cups 320 and depositing thereon a film of adhesive. When the carriage 330 is moved in the opposite direction the gears 414 will necessarily be rotated in an opposite direction, but the clutching arrangement is such that rotation of the gears 414 in said opposite direction will not be imparted to the drums 408.

It has been found that the lower surface of the flanges 322 of the cups 320 have a tendency to accumulate dried adhesive, and this interferes with their efficient function as glue-depositing agents. Consequently, it has been found desirable to incorporate into the machine a pair of wipers effective to clean the flanges 322 once each cycle. These wipers comprise cloth-faced discs 416 (see Figs. 1 and 2) mounted on sleeves 418 receivable over and vertically slidable with respect to shafts 420. The sleeves 418 rotate with the shafts 420 by means of pin and slot interconnections 422, and are provided at their lower end with a ring 424 engaged by a fork 426 on plate 428 mounted on a suitable vertical standard so as to be vertically slidable. The plate 428 has a downward extension 430 secured thereto (see Figs. 1 and 12) which carries at its lower end cam follower 432 engageable by lateral projection 434 on the cam 404 so as to lift the plate 428, and hence the disc 416, when the carriage 330 has been moved to its position shown in Fig. 1, the discs 416 thus contacting the lower surfaces of flanges 322. In order to facilitate the wiping action the shaft 420 is constantly rotated through the gear train generally designated 436, that gear being driven by gear 438 on the cam shaft 12.

*Air control*

In order to control the application of suction within the die elements 84, a pair of cams 440, 440' (see Figs. 1 and 14) are mounted on the cam shaft 12 for rotation therewith, and arms 442, 442' are pivotally mounted at 444 on the frame of the apparatus, those arms having cam followers 446 and 446' respectively engaging the peripheries of the cams 440 and 440' respectively. The extending ends of the arms 442, 442' are pivotally secured at 448 to links 450, 450' which extend downwardly and actuate the valves 30, 30', opening and closing those valves at appropriate times during a cycle of the machine so that suction is applied within the forming mechanisms A and A' via the conduits 32, 32'.

In order to assist in ejection of the finished and united powder puff blank, compressed air may be employed active to urge the completed powder puff out of the forming mechanism A. To this end the upper portion of the side walls 92 of the rings 90 within the die elements 84 may be provided with a plurality of small apertures 452 (see Fig. 4) which communicate with a groove 454 around the ring 90, that groove in turn communicating by means of passages 456 (see Fig. 2), with the shaft 24 on which the forming mechanisms A and A' are pivotally mounted, that shaft 24 being partially hollow and being connected by means of conduit 40 to compressed air valve 38 the other end of which is connected, by means of conduit 36, to the air compressor 34. A control member 458 extends upwardly from the valve 38 so as to actuate the same, the control member 458 carrying a cam follower 460 engageable with a cam projection 462 on the periphery of the cam 378. The position of the cam projection 462 on the cam 378 times the inflow of compressed air into the die elements A or A' through the orifices 452 in the side walls 92 thereof.

*Operation of apparatus*

A complete cycle of the operation of the apparatus will now be set forth in detail so as to indicate the mode of cooperation of the various components of the machine and the manner in which they are synchronously moved to perform their desired functions. It will be understood that one or several of the components can be eliminated, concomitantly eliminating the automatic performance of their function, and an operative and effective machine will still result. It will also be understood that, while the precise timed sequence of operation herein described has been found to be exceedingly effective to perform certain functions in a most efficient manner, other timed sequences differing somewhat therefrom in detail might also be employed. In this description of operation the mechanical linkages and cams which cause the operation will, in the interests of clarity, not be specifically referred to, those linkages and cams having already been described in some detail.

For a good understanding of the timed relation of the various operations particular reference may be had to Fig. 19, a graphical representation (not in scale) of the development of some of the cam surfaces which control the motion of the various components, all of said developments being illustrated for a single cycle of the apparatus and disclosing the effective relationship of the cam surfaces for a single rotation of the cam shaft 12 from its starting position, indicated at the top of the figure by 0, through one complete rotation of 360° back again to its starting position where another cycle can be commenced.

At the start of a cycle of the machine the components take the position illustrated in Figs. 1 and 2. The forming mechanisms A and A' are in forming position with their open mouths parallel, in line, and exposed, the carriage B is in loading position remote therefrom, the forcing mechanisms C, C' are swung outwardly so as not to interfere with the forming mechanisms A, A' and the gluing means D, D' are in a position on the side of the glue drums 408 remote from the forming mechanisms A, A'.

As the cam shaft commences rotating the carriage B, upon which the operator has placed the casing elements 2 and the wads of padding 4, is moved to its delivering position over the forming mechanisms A, A'. While this motion is occurring the forcing means C and C' are pivoted so as to swing over the forming mechanisms A, A'. Both of these operations have been completed when the cam shaft has turned through approximately 75°. Slightly prior to the completion of these motions, the valves 30 and 30' are opened so that suction is applied within the die elements 84. It will be noted particularly from Figs. 4–8 that when the carriage C reaches its delivering position it is very close to the top surface of the die element 84, thus defining narrow air inlet passages generally designated 464 around the periphery of the die elements 84. When the forcing means C and C' are in operative position above and aligned with the apertures 48 in the carriage B and the open mouths of the die elements 84, but before the forcing means C and C' are reciprocated toward the forming mechanisms A and A', air will flow into the die elements 84 via narrow air passages 464 and to some extent through the casing blanks 2 and wads of padding 4 on the carriage B and then through the apertures 48. Since the suction is exerted via the passages 114 in the plunger-like bottom walls 94 of the die elements 84 this suction will aid in causing the powder puff blanks to enter the die elements.

When the carriage B and the forcing means C, C' have reached their delivering and operative positions respectively the bottom wall 94 of the die element 84 is moved upwardly, the ring of pins 120 therein engaging the lower and usually pile surface of the casing blank 2. In this motion the bottom wall 94 moves completely out of the die element 84 and up through the aperture 48 in the carriage B. This motion is completed when the cam shaft 12 has rotated through 90°. Then the forcing means C, C' are moved downwardly, the plunger 224 slightly in advance of the shell 222 so as to positively grasp the powder puff blank between the plunger 224 and the bottom wall 94 of the die element 84. All three parts then move down together (see Fig. 5) thus forcing the blank through the aperture 48 and into the open mouth of the die element 84, the plunger 224 extending out from the shell 222 so as to provide space for the periphery of the casing element 2 to extend upwardly around the side edges of the padding 4, the periphery of the casing element 2 being substantially vertically directed, as may best be seen from Fig. 6.

It will be noted that when the shell 222 enters within the aperture 48 in the carriage B it substantially and snugly fills that aperture and would, unless other means were provided, prevent the passage of air therethrough in response to the application of suction within the die element 84. At this stage in the operation of the machine that would not be desirable, since the flow of air aids in forcing the powder puff blank into the die elements 84 and in retaining them there. Consequently, the plunger 224 is provided with air passages 466 and the shell 222 is provided with air passages 468 which do not register with the passages 466. So long as the plunger 224 is positioned in advance of the shell 222, so that the inner surfaces of plunger and shell are separated, air is still permitted to pass through the forcing means C, C' and thus facilitate the setting of the blank within the die element 84.

After the cam shaft has rotated approximately 130° the position illustrated in Fig. 6 is reached. Thereafter, the plunger 224 is retracted with respect to the shell 222 so as to effectively seal the air passages 466 and 468. As a result, substantially all of the air entering the die element 84 in response to the application of suction therein must enter through the narrow air passages 464 between the carriage B and the forming mechanisms A and A'. (It will be remembered that the casing blanks 2 and wads of padding 4 are air-permeable, and hence suction exerted via the apertures 114 in the bottom wall 94 causes air to flow through the blanks 2 and padding 4, that air entering the die element 84 at this time in the cycle via the passages 464 at the top of the die element 84.) Air thus entering is directed against the upstanding periphery of the casing element 2 and causes the portion of the periphery extending above the wad of padding 4 to be in-bent over the passage. This condition is illustrated in Fig. 7. Thereafter, when the cam shaft has rotated through approximately 135°, the plunger 224 and shell 222 are moved down together, the depending lip of the shell 222 engaging the in-bent periphery of the casing element 2 and pressing it and the wadding 4 down firmly against the bottom wall 94 of the die element 84 (see Fig. 8). This is accomplished when the cam shaft is rotated through approximately 140°.

Thereafter the shell 222 and plunger 224 are moved in the opposite direction out of the aperture 48 in the carriage B. They may be moved together, with the plunger 224 still pressed against the shell 222 so as to seal the passages 426 and 468, but it has sometimes been found desirable to retract the shell 222 somewhat in advance of the plunger 224 so as to permit air to once again flow through the passages 466 and 468, this permitting the breaking of the suction within the die element 84 before retraction is attempted. It will be noted from Fig. 8 that when the shell 222 has penetrated the open mouth of the die element 84, which it fits relatively snugly, substantially no air can enter the die element 84, the suction pulling the casing blank firmly against the bottom wall 94 and thus directly aiding the pressure exerted by the forcing means C and C'.

As here specifically disclosed the flow of air which in-bends the periphery of the casing elements 2 enters the die elements 84 through the passages 464 at the top thereof between the said die elements 84 and the carriage B. In this position the carriage B and the die elements 84 may be considered as two parts of a unitary die element, since when the carriage B is in its delivering position it merely functions as a guide for the powder puff blank as it is moved toward the bottom wall 94 and into the die element proper. If no carriage B were provided a comparable air inlet means 464 could be formed in the die element 84 itself. Thus air flow means could be provided for in-bending the periphery of the powder puff casing blank without utilizing a carriage B, or, even if a carriage B were utilized, an additional air inlet means could be provided properly oriented with respect to the periphery of the powder puff casing blank, depending upon the depth of the die element 84 and the thickness of the padding 4.

If the application of suction be insufficient to provide for an air flow adequate to in-bend the periphery of the blank, compressed air jets could be provided around the periphery of the die elements 84 for that purpose. The orifices 452 previously described are not here used for that purpose, since they are positioned somewhat below the blank periphery which is to be in-bent, but it is obvious that, by a simple redesign and repositioning, they could be utilized for that purpose.

During the time that the above described operations are taking place, the glue carriage 330 has started to move forward. As shown in Fig. 19 this motion commences at approximately 125° of rotation of the cam shaft 12. The cups 320 are moved slightly downwardly so as to engage the upper surface of the drums 408 and thus have a layer of glue or other adhesive deposited thereon. Before the glue carriage 330 reaches its glue depositing position (this does not occur until the cam shaft has rotated approximately 215°) the carriage B is moved back to its loading position and the forcing means C, C' are returned to their inoperative position as illustrated in Figs. 1 and 2. Hence when the glue carriage 330 reaches the forming mechanisms A and A' the space above those mechanisms has been cleared. When the glue carriage 330 reaches glue-depositing position (at approximately 215° of rotation of the cam shaft) the cups 320, which have been moving down all the time, are given their final degree of downward movement, causing them to move from the solid line position in Fig. 9 to the broken line position in Fig. 9 so as to transfer the layer of adhesive on the lower surface of their flanges 322 to the exposed surface of the in-bent periphery of the casing elements 2. It will be noted that suction has remained on in the die elements 84 so that the powder puff casing blanks and the in-bent periphery of the casing elements 2 are retained in proper position.

The carriage B reaches its loading position when the cam shaft has rotated approximately 238°, and for the remainder of the cycle of the machine remains stationary so that the operator has ample time to place a new load of casing elements 2 and wads of padding 4 thereon.

After glue has been deposited on the in-bent periphery of the powder puff casing blanks 2 the cups 320 are retracted and the glue carriage 330 is returned to its initial position. The shells 320 are fully retracted before they reach the drums 408 so that they clear the drums 408 and no new supply of adhesive is transferred thereto. Sometime during the period before the glue carriage 330 is again moved to glue-depositing position the rotating wipers 416 (if provided) are lifted so as to clean the lower surfaces of the lips 322 of the shells 320 (this operation is not schematically disclosed in Fig. 19).

When the glue carriage 330 has been retracted sufficently to clear the forming mechanisms A and A', those mechanisms are pivoted about shaft 24 to their assembling position in which their open mouths abut. This commences at approximately 250° of the cam shaft rotation. When they have reached this position, as illustrated in Fig. 10, the bottom walls 94 of the die elements 84 are moved toward one another so as to press the glue-bearing surfaces of the in-bent periphery of the individual powder puff blanks into abutting adhered relation. Suction is still maintained, the slightly raised portions 122 on the top surfaces of the die elements 84 providing between themselves a space for the passage of air therethrough. The motion of the bottom walls 94 toward one another is completed at approximately 305° of rotation of the cam shaft.

Thereafter the bottom walls 94 of the die elements 84 are retracted, the suction in one of said die elements 84 (here shows as that of the forming mechanism A') being cut off. Since suction is still exerted in the other die element 84 (that of the forming mechanism A) and since that suction is exerted through passages 114 in its bottom wall 94, the united powder puff remains in this forming mechanism A. While the suction remains on in that die element, the two die elements are returned to forming position, and as a result, the united powder puff blank will remain in that one of the forming mechanisms, here shown as the forming mechanism A, in which suction has been applied the longest.

When the die elements 84 have returned to forming position the completed and united powder puff blank may be removed from the forming mechanism A, the apparatus being in condition to perform a new cycle.

As an additional feature, it has been found that automatic ejection of the completed powder puff may be achieved by causing the bottom wall 94 of the die element 84 of the forming mechanism A within which the completed powder puff is retained at the end of a cycle to move upwardly toward the open mouth of the die element 84 when in forming position while the carriage B is being moved to delivering position in the next cycle (see depression 469 in cam 190, Fig. 18). This will cause the powder puff blank to project well above the open mouth of the die element 84, and the carriage B, in moving to delivering position, will engage the thus projecting powder puff blank and forcibly push it out of the die element 84 and into the ejection chute 470, from which it may be directed into any suitable container. In order to facilitate ejection in this manner compressed air forced out through the orifices 452 in the side walls 92 of the die element 84 may be employed, those orifices 452 being positioned substantially in line with the bottom of the completed powder puff when it is caused to project from the die element 84 for ejection. The effect of this flow of air is to disengage the powder puff blank from the bottom wall 94 and the ring of pins 120 carried thereby and to cause it to float on air until it is pushed to one side by the carriage B.

The apparatus here disclosed consists of a large number of automatically actuated components which are operated in such a manner as to produce, in a fully automatic and highly efficient manner, a completed powder puff blank. While the apparatus has been specifically described in connection with a particular blank, it will be apparent that it is adaptable to the formation of blanks of other sizes, shapes and compositions. The various components of the apparatus may, of course, be differ- ently shaped or constructed without departing from the spirit of the invention, and the mode of cooperation of the components generically considered can also be varied within wide limits for the attainment of desired ends, all within the scope of the present invention as defined in the following claims.

We claim:

1. In a machine for manufacturing powder puffs, a die element having a bottom wall and a side wall, said die element having a diameter less than that of a powder puff casing blank which is placeable over the mouth of the said die element, said powder puff blank being movable into the die element to take the contour of the same, means for holding the thus shaped casing in the die element, an air inlet means adjacent the top of said die element oriented substantially at right angles to said side wall against the periphery of the blank which extends at the top of said die element, and means for causing air to flow into said die element via said air inlet, said blank periphery being adapted to be in-bent by the flow of air into the said die element through said air inlet means.

2. A machine for manufacturing powder puffs comprising two forming mechanisms, each for forming a half of a powder puff blank, each of said mechanisms comprising a die element having an open mouth into which a powder puff blank is forced to take the contour of said element, said pair of die elements being mounted so as to be movable between a forming position in which their open mouths are substantially coplanar and an assembling position in which their open mouths abut.

3. In the machine of claim 2, a carriage movable relative to said die elements between a loading position remote from said die elements and a delivering position adjacent the open mouths of said die elements when said die elements are in forming position, said carriage having a pair of apertures registrable with said open mouths when said carriage is in its delivering position, said apertures having a diameter less than that of powder puff casing blanks which are placeable on said carriage over said apertures on the other side thereof from said die elements and forcing means movable independently of said carriage between an operative position over the open mouths of each of said die elements when they are in their forming position and an inoperative position to one side of said die elements so as to permit said elements to be moved to their assembling position, said forcing means when in operative position being reciprocable toward and away from said open mouths so as to force powder puff blanks into said die elements, said carriage in delivering position being positioned between said forcing means in operative position and the open mouths of said die elements in forming position, whereby said forcing means can force said blanks through the apertures in said carriage and into the die elements, via the open mouths thereof.

4. In the machine of claim 2, a carriage movable between a loading position remote from said die elements and a delivering position adjacent the open mouths of said die elements when said die elements are in forming position, said carriage having a pair of apertures registrable with said open mouths when said carriage is in its delivering position, said apertures having a diameter less than that of powder puff casing blanks which are placeable on said carriage over said apertures, said carriage, when in delivering position, being positioned close to the open mouths of said die elements in forming position so as to define between itself and said die elements narrow air inlet passages around said open mouths, and means for causing air to flow into said die elements via said air inlet passages, said air flow serving to in-bend the periphery of the powder puff casing blanks after said blanks have been forced into said die elements.

5. In the machine of claim 2, means for applying suction within said die elements, a carriage movable between a loading position remote from said die elements and a delivering position adjacent the open mouths of said die elements when said die elements are in forming position, said carriage having a pair of apertures registrable with said open mouths when said carriage is in its delivering position, said apertures having a diameter less than that of powder puff casing blanks which are placeable on said carriage over said apertures, said carriage, when in delivering position, being positioned close to the open mouths of said die elements in forming position so as to define between itself and said die elements narrow air inlet passages around said open mouths, air moving through said passages into said die elements in response to the application of suction therewithin serving to in-bend the periphery of the powder puff casing blanks after said blanks have been forced into said die elements.

6. In the machine of claim 2, forcing means movable relative to said die elements between an operative position over the open mouths of each of said die elements in forming position and an inoperative position to one side of said die elements so as to permit said elements to be moved to assembling position, said forcing means when in operative position being reciprocable toward and away from said open mouths so as to force powder puff blanks into said die elements, a carriage movable between a loading position remote from said die elements and a delivering position adjacent the open mouths of said die elements when said die elements are in forming position, said carriage having a pair of apertures registrable with said open mouths when said carriage is in its delivering position, said apertures having a diameter less than that of powder puff casing blanks which are placeable on said carriage over said apertures, said carriage, when in delivering position, being positioned between said forcing means in operative position and the open mouths of said die elements in forming position and close to said open mouths so as to define between itself and said die elements narrow air inlet passages around said open mouths, and means for causing air to flow into said die elements via said air inlet passages, said air flow serving to in-bend the periphery of the powder puff casing blanks after said blanks have been forced into said die elements.

7. In the machine of claim 2, forcing means movable relative to said die elements between an operative position over the open mouths of each of said die elements in forming position and an inoperative position to one side of said die elements so as to permit said elements to be moved to assembling position, said forcing means when in operative position being reciprocable toward and away from said open mouths so as to force powder puff blanks into said die elements, and means for applying suction within said die elements, a carriage movable between a loading position remote from said die elements and a delivering position adjacent the open mouths of said die elements when said die elements are in forming position, said carriage having a pair of apertures registrable with said open mouths when said carriage is in its delivering position, said apertures having a diameter less than that of powder puff casing blanks which are placeable on said carriage over said apertures, said carriage, when in delivering position, being positioned between said forcing means in operative position and the open mouths of said die elements in forming position and close to said open mouths so as to define between itself and said die elements narrow air inlet passages around said open mouths, whereby air moving into said die elements in response to the application of suction therewithin will flow through said air inlet passages and will function to in-bend the periphery of the powder puff casing blanks after said blanks have been forced into said die elements.

8. A machine for manufacturing powder puffs comprising two forming mechanisms, each for forming a half of a powder puff blank, each of said mechanisms comprising a die element having an open mouth into which a powder puff blank is forced to take the contour of said element, said pair of die elements being coaxially pivotally mounted so as to be pivotable between a forming position on opposite sides of said axis in which their open mouths are substantially coplanar and an assembling position on the same side of said axis in which their open mouths abut.

9. In the machine of claim 8, a carriage movable relative to said die elements between a loading position remote from said die elements and a delivering position adjacent the open mouths of said die elements when said die elements are in forming position, said carriage having a pair of apertures registrable with said open mouths when said carriage is in delivering position, said apertures having a diameter less than that of powder puff casing blanks which are placeable on said carriage over said apertures on the other side thereof from said die elements and forcing means movable independently of said carriage between an operative position over the open mouths of each of said die elements when they are in their forming position and an inoperative position to one side of said die elements so as to permit said elements to be moved to their assembling position, said forcing means when in operative position being reciprocable toward and away from said open mouths so as to force powder puff blanks into said die elements, said carriage in delivering position being positioned between said forcing means in operative position and the open mouths of said die elements in forming position, whereby said forcing means can force said blanks through the apertures in said carriage and into the die elements, via the open mouths thereof.

10. In the machine of claim 8, a carriage movable between a loading position remote from said die elements and a delivering position adjacent the open mouths of said die elements when said die elements are in forming position, said carriage having a pair of apertures registrable with said open mouths when said carriage is in its delivering position, said apertures having a diameter less than that of powder puff casing blanks which are placeable on said carriage over said apertures, said carriage, when in delivering position, being positioned close to the open mouths of said die elements in forming position so as to define between itself and said die elements narrow air inlet passages around said open mouths, and means for causing air to flow into said die elements via said inlet passages, said air flow serving to in-bend the periphery of the powder puff casing blanks after said blanks have been forced into said die elements.

11. In the machine of claim 8, forcing means movable relative to said die elements between an operative position over the open mouths of each of said die elements when they are in forming position and an inoperative position to one side of said die elements so as to permit said elements to be moved to assembling position, said forcing means when in operative position being reciprocable toward and away from said open mouths so as to force powder puff blanks into said die elements, a carriage movable between a loading position remote from said die elements and a delivering position adjacent the open mouths of said die elements when said die elements are in forming position, said carriage having a pair of apertures registrable with said open mouths when said carriage is in its delivering position, said apertures having a diameter less than that of powder puff casing blanks which are placeable on said carriage over said apertures, said carriage, when in delivering position, being positioned between said forcing means in operative position and the open mouths of said die elements in forming position and close to said open mouths so as to define between itself and said die elements narrow air inlet passages around said open mouths, and means for causing air to flow into said die elements via said air inlet passages, said air flow serving to in-bend the periphery of the powder puff casing blanks after said blanks have been forced into said die elements.

12. In a machine for manufacturing powder puffs, a die element having a bottom wall, a side wall and an open mouth, a carriage movable relative to said die element between a loading position remote from said die element and a delivering position adjacent the open mouth of said die element, said carriage having an aperture therein registrable with said open mouth when said carriage is in delivering position, said aperture and said die element having a diameter less than that of a powder puff casing blank which is placeable on said carriage over said aperture on the other side thereof from said die element and moveable into said die element to take the contour of the same, forcing means independent of said carriage adjacent said die element on the other side of said carriage from said die element and passable through the aperture in said carriage to force said blank through said aperture and into said die element, and means operatively connected to said carriage and said forcing means for independently moving them in timed relationship, so that said carriage is moved from loading to delivering position, said forcing means is reciprocated into said aperture toward said die element and out, and said carriage is returned to loading position.

13. In the machine of claim 12, said forcing means substantially filling the aperture in said carriage as it enters thereinto and said carriage, when in delivering position, being positioned close to the open mouth of said die element so as to define between itself and said die element a narrow air inlet passage around said open mouth, and means for causing air to flow into said die element via said air inlet passage, said air flow serving to in-bend the periphery of said blank which extends at the top of said die element.

14. In the machine of claim 12, means for applying suction within said die element, said forcing means substantially filling the aperture in said carriage as it enters thereinto, and said carriage, when in delivering position, being positioned close to the open mouth of said die element so as to define between itself and said die element a narrow air inlet passage around said open mouth, whereby air moving into said die element in response to the application of suction therewithin will flow through said air inlet passage and will function to in-bend the periphery of said blank which extends at the top of said die element.

15. The machine of claim 12 in which the bottom wall of said die element is movable with respect to said side wall, means on said bottom wall for grasping the blank and means operatively connected to said bottom wall for moving the bottom wall toward said forcing means at the beginning of the movement of said forcing means through said aperture so as to grasp said blank, and for then moving said bottom wall substantially with said forcing means to carry said blank into said die element.

16. In the machine of claim 15, means for imparting further movement to said forcing means toward said bottom wall after said bottom wall has reached the limit of its motion along with said forcing means, whereby said blank is compressed.

17. The machine of claim 12, in which said forcing means comprises a shell movable toward and away from said die element and a plunger in said shell independently movable into and out from said shell.

18. In the machine of claim 17, means operatively connected to said plunger and said shell effective in timed sequence to move said plunger out of said shell so as to overlie the central portion of said blank, move said plunger and shell toward said die element so as to force said blank thereinto, retract said plunger within said shell, and then move said shell further toward said die element, and means effective after said plunger has been retracted within said shell and before said shell has been effectively further moved for in-bending the periphery of said shaped blank, further effective motion of said shell forcing down the in-bent periphery of said blank.

19. In the machine of claim 17, said shell substantially filling the aperture in said carriage as it passes therethrough, and said carriage, when in delivering position, being positioned close to the open mouth of said die element so as to define between itself and said die element a narrow air inlet passage around said open mouth, and means for causing air to flow into said die element via said air inlet passage, said air flow serving to in-bend the periphery of said blank which extends at the top of said die element.

20. In the machine of claim 17, means for applying suction within said die element, said shell substantially filling the aperture in said carriage as it passes therethrough, and said carriage, when in delivering position, being positioned close to the open mouth of said die element so as to define between itself and said die element a narrow air inlet passage around said open mouth, the application of suction within said die element thereby causing air to flow through said passage into said die element and in-bend the periphery of said blank which extends at the top of said die element.

21. In the machine of claim 17, means operatively connected to said plunger and said shell effective in timed sequence to move said plunger out of said shell so as to overlie the central portion of said blank, move said plunger and shell toward said die element so as to force said blank thereinto, retract said plunger within said shell, and then move said shell further toward said die element, said shell substantially filling the aperture in said carriage as it passes therethrough, and said carriage, when in delivering position, being positioned close to the open mouth of said die element so as to define between itself and said die element a narrow air inlet passage around said open mouth, means for causing air to flow into said die element via said air inlet passage, said air flow moving through said passage to said shell serving to in-bend the periphery of said blank which extends at the top of said die element, said periphery being in-bent after said plunger has been retracted within said shell and before said shell has been effectively moved further, said further effective motion of said shell forcing down the in-bent periphery of said blank.

22. In a machine for manufacturing powder puffs, a die element having a bottom wall, a side wall and an open mouth, said die element having a diameter less than that of a powder puff casing blank which is placeable over said open mouth, and forcing means above said die element for forcing said blank into said die element to take the contour of the same, said forcing means comprising a shell movable toward and away from said die element and a plunger in said shell independently movable into and out from said shell, both said shell and said plunger being smaller than the diameter of said die element so as to be enterable thereinto.

23. In the machine of claim 22, means operatively connected to said plunger and said shell effective in timed sequence to move said plunger out of said shell so as to overlie the central portion of said blank, move said plunger and shell toward said die element so as to force said blank thereinto, retract said plunger within said shell, and then move said shell further toward said die element, and means effective after said plunger has been retracted within said shell and before said shell has been effectively further moved for in-bending the periphery of said shaped blank, further effective motion of said shell forcing down the in-bent periphery of said blank.

24. In the machine of claim 22, an air inlet means adjacent the top of said element around the periphery thereof and oriented substantially against the periphery of the blank which extends at the top of said die element, and means for causing air to flow into said die element via said air inlet means, said periphery being in-bent by said flow of air.

25. In the machine of claim 24, means operatively connected to said plunger and said shell effective in timed sequence to move said plunger out of said shell so as to overlie the central portion of said blank, move said plunger and shell towards said die element so as to force said blank thereinto, retract said plunger within said shell, and then move said shell further toward said die element, whereby said flow of air will function to in-bend the periphery of said blank after said plunger has been retracted within said shell and before said shell has been effectively further moved, said further motion of said shell forcing down the in-bent periphery of said blank.

26. In a machine for manufacturing powder puffs, a die element having a side wall, an open mouth, and a bottom wall movable toward and away from said open mouth, a carriage movable relative to said die element between a loading position remote from said die element and a delivering position adjacent the open mouth of said die element, said carriage having an aperture therein registrable with said open mouth when said carriage is in its delivering position, said aperture having a diameter less than that of a powder puff casing blank which is placeable on said carriage over said aperture on the other side thereof from said die element and which is movable into said die element to take the contour of the same, forcing means independent of said carriage adjacent said die element on the other side of said carriage from said die element and passable into the aperture in said carriage to force said blank through said aperture and into said die element, and means operatively connected to said carriage, said forcing means and said bottom wall for moving them in timed sequence so that said carriage is moved to delivering position, said forcing means is reciprocated into said aperture toward said die element and back so as to move said blank into said die element, said carriage is returned to loading position, said bottom wall is then moved toward said open mouth so as to cause said casing blank to project above said open mouth, and said carriage is then returned to delivering position, said carriage, in thus returning, engaging the thus projecting blank and pushing it from said die element.

27. In a machine for manufacturing powder puffs, a pair of forming mechanisms, each for forming a half of a powder puff blank, each of said mechanisms comprising a die element having a side wall, an open mouth, and a bottom wall, the bottom wall of at least one of said die elements being movable toward and away from said open mouth, said die elements being mounted so as to be movable between a forming position in which their open mouths are exposed and an assembling position in which their open mouths abut, a carriage movable relative to said die elements between a loading position remote from said die elements and a delivering position adjacent the open mouths of said die elements when said die elements are in forming positions, said carriage having a pair of apertures registrable with said open mouths when said carriage is in its delivering position, said apertures having a diameter less than that of powder puff casing blanks which are placeable on said carriage over said apertures and which are movable into said die elements to take the contour of the same, and means operatively connected to said die elements, said carriage and said bottom wall for moving them in timed sequence so that said die elements are positioned in forming positions, said carriage is moved to delivering position, said blanks then being moved into said die elements, said carriage is moved to loading position, said die elements are moved to assembling position, the bottom wall of one of said die elements is moved toward other so as to press each of said individual blanks together and form a united blank, and said die elements are returned to forming position.

28. In a machine for manufacturing powder puffs, a pair of forming mechanisms, each for forming a half of a powder puff blank, each of said mechanisms comprising a side wall, an open mouth, and a bottom wall, the bottom wall of at least one of said die elements being movable toward and away from said open mouth, said die elements being mounted so as to be movable between a forming position in which their open mouths are exposed and an assembling position in which their open mouths abut, a carriage movable relative to said die elements between a loading position remote from said die elements and a delivering position adjacent the open mouths of said die elements when said die elements are in forming position, said carriage having a pair of apertures registrable with said open mouths when said carriage is in delivering position, said apertures having a diameter less than that of powder puff casing blanks which are placeable on said carriage over said apertures and which are movable into said die elements to take the contour of the same, forcing means movable relative to said die elements between an operative position over the open mouths of each of said die casings in forming position and an inoperative position to one side of said die elements so as to permit said die elements to be moved to assembling position, said forcing means when in operative position being reciprocable toward and away from said open mouths so as to force powder puff blanks into said die elements, said carriage in delivering position being positioned between said forcing means in operative position and the open mouths of said die casings in forming position, whereby said forcing means can force said blanks through the apertures in said carriage and into the die casings via the open mouths thereof, and means operatively connected to said die elements, said carriage, said forcing means and said bottom wall for moving them in timed cyclical sequence so that said die elements are positioned in forming position, said forcing means are positioned in operative position and said carriage is moved to delivering position, said forcing means are reciprocated through said apertures toward said die elements and back so as to move said blanks into said die elements, said forcing means are moved to inoperative position and said carriage is moved to loading position, said die elements are moved to assembling position, the bottom wall of one of said die elements are moved toward the other so as to press each of said individual blanks together and form a united blank, and said die elements are returned to forming positions.

29. In a machine for manufacturing powder puffs, a pair of forming mechanisms, each for forming a half of a powder puff blank, each of said mechanisms comprising a die element having a side wall, an open mouth and a bottom wall, said die elements being mounted so as to be movable between a forming position in which their open mouths are exposed and an assembling position in which their open mouths abut, said die elements having a diameter less than that of powder puff casing blanks which are movable into the die elements to take the contour of the same, means for in-bending the periphery of the blanks which extend adjacent the top of said die element, a gluing means movable relative to said die elements between a glue-obtaining position remote from said die elements and a glue-depositing position above the open mouths of said die elements in forming position, said gluing means depositing glue on the in-bent periphery of said blank, and means operatively connected to said die elements, said means for in-bending and said gluing means for operating them in timed sequence so that said die elements are positioned in their forming positions, said casing blanks being then movable thereinto, said in-bending means are actuated to in-bend the periphery of said blank, said gluing means are moved from their glue-obtaining position to their glue-depositing position, glue being thereby deposited on the in-bent periphery of said blanks, said gluing means are moved away from their glue-depositing position, said die elements are moved to their assembling position so as to unite said blanks, and said die elements are returned to their forming position.

30. In a machine for manufacturing powder puffs, a die element having a bottom wall, a side wall and an open mouth, said die element having a diameter less than that of a powder puff casing blank which is movable into said die element to take the contour of the same, air inlet means in said die element oriented substantially against the periphery of the blank which extends toward the open mouth of said die element, forcing means adjacent said die element, said forcing means comprising a shell movable into said die element so as to force said blank thereinto, said shell substantially filling the open mouth of said die element as it enters thereinto, and a plunger in said shell independently movable into and out from said shell, said plunger having air passages therethrough and said shell having non-registering air passages therethrough, means in said die element for applying suction therein, and means operatively connected to said shell, said plunger and said suction means for actuating them in timed relationship so that said shell and plunger are separated, thereby permitting air to flow through the passages in said shell and said plunger, said forcing means is moved into said die element so as to force said blank thereinto, said suction means is actuated to exert suction within said die element, and said plunger and said shell are moved against one another while said shell remains in said die element, thus cutting off air flow through the passages in said shell and plunger and causing air to flow into said die element largely through said air inlet means and in-bend the periphery of said blank at the top of said die element.

31. In a machine for manufacturing powder puffs, a die element having a bottom wall, a side wall and an open mouth, said die element having a diameter less than that of a powder puff casing blank which is movable into said die element to take the contur of the same, air inlet means in said die element oriented substantially against the periphery of the blank which extends toward the open mouth of said die element, forcing means adjacent said die element, said forcing means comprising a shell movable into said die element so as to force said blank thereinto, said shell substantially filling the open mouth of said die element as it enters thereinto, and a plunger in said shell independently movable into and out from said shell, said plunger having air passages therethrough and said shell having non-registering air passages therethrough, means in said die element for applying suction therein, and means operatively connected to said shell, said plunger and said suction means for actuating them in timed relationship so that said shell and plunger are separated, thereby permitting air to flow through the passages in said shell and said plunger, said forcing means is moved into said die element so as to force said blank thereinto, said suction means is actuated to exert suction within said die element, said plunger and said shell are moved against one another while said shell remains in said die element, thus cutting off air flow through the passages in said shell and plunger and causing air to flow into said die element largely through said air inlet means and in-bend the periphery of said blank at the top of said die element, and said shell is then moved further into said die element so as to engage and press down the in-bent periphery of said blank.

References Cited in the file of this patent

UNITED STATES PATENTS

| | | |
|---|---|---|
| 1,908,823 | Daniell | May 16, 1933 |
| 1,980,022 | Whitehouse | Nov. 6, 1934 |
| 2,484,336 | Epstein et al. | Oct. 11, 1949 |
| 2,509,266 | Epstein et al. | May 30, 1950 |
| 2,535,642 | Liebowitz | Dec. 26, 1950 |
| 2,620,854 | Wetherell | Dec. 9, 1952 |
| 2,672,178 | Levy-Hawes et al. | Mar. 16, 1954 |